US009648330B2

United States Patent
Pu et al.

(10) Patent No.: US 9,648,330 B2
(45) Date of Patent: May 9, 2017

(54) INTER-COLOR COMPONENT RESIDUAL PREDICTION

(71) Applicant: QUALCOMM Incorporated, San Diego, CA (US)

(72) Inventors: Wei Pu, San Diego, CA (US); Woo-Shik Kim, San Diego, CA (US); Jianle Chen, San Diego, CA (US); Joel Sole Rojals, La Jolla, CA (US); Liwei Guo, San Diego, CA (US); Chao Pang, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 14/331,166

(22) Filed: Jul. 14, 2014

(65) Prior Publication Data

US 2015/0016512 A1   Jan. 15, 2015

Related U.S. Application Data

(60) Provisional application No. 61/846,581, filed on Jul. 15, 2013, provisional application No. 61/847,839, filed on Jul. 18, 2013.

(51) Int. Cl.
 *H04N 19/186*   (2014.01)
 *H04N 19/147*   (2014.01)
 (Continued)

(52) U.S. Cl.
 CPC ......... *H04N 19/147* (2014.11); *H04N 19/105* (2014.11); *H04N 19/176* (2014.11); *H04N 19/186* (2014.11); *H04N 19/61* (2014.11)

(58) Field of Classification Search
 CPC .. H04N 19/176; H04N 19/147; H04N 19/186; H04N 19/61; H04N 19/105
 (Continued)

(56) References Cited

U.S. PATENT DOCUMENTS

| 2011/0206287 A1* | 8/2011 | Islam | H04N 19/60 |
| | | | 382/233 |
| 2013/0300591 A1* | 11/2013 | Marpe | H03M 7/40 |
| | | | 341/67 |

(Continued)

FOREIGN PATENT DOCUMENTS

| EP | 1507415 A2 | 2/2005 |
| EP | 1538844 A2 | 6/2005 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Nguyen Truong
(74) *Attorney, Agent, or Firm* — Shumaker & Sieffert, P.A.

(57) ABSTRACT

A device for decoding video data includes a memory configured to store video data, and at least one processor. The at least one processor may be configured to: determine luma residual samples for a block of video data, determine predictive chroma residual samples for the block of video data, scale the luma residual samples with a scale factor to produce scaled luma residual samples, and determine updated chroma residual samples based on the predictive chroma residual samples and the scaled luma residual samples.

52 Claims, 5 Drawing Sheets

(51) Int. Cl.
*H04N 19/105* (2014.01)
*H04N 19/61* (2014.01)
*H04N 19/176* (2014.01)

(58) Field of Classification Search
USPC ........................................ 375/240.03, 240.02
See application file for complete search history.

(56) References Cited

U.S. PATENT DOCUMENTS

| | | |
|---|---|---|
| 2014/0348240 A1 | 11/2014 | Kim et al. |
| 2014/0376611 A1 | 12/2014 | Kim et al. |
| 2015/0117519 A1 | 4/2015 | Kim et al. |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanded video coding for generic audiovisual services, The International Telecommunication Union. Apr. 2015, 634 pp.

Flynn, et al., "High Efficiency Video Coding (HEVC) Range Extensions text specification: Draft 2 (for PDAM)," (Joint Collaborative Team on Video Coding of ISO/IEC JTC1/SC29/WG11 and ITU-T SG.16); Jan. 14-23, 2013, Document: JCTVC-L1005_v4, 313 pp.

Kim, "RCE1: The performance of extended chroma mode for non 4:2:0 format," (Joint Collaborative Team on Video Coding of ISO/IEC JTC1/SC29/WG11 and ITU-T SG.16); Apr. 18-26, 2013, Document: JCTVC-M0097_WD, 10 pp.

Schwarz, et al., "Description of 3D Video Technology Proposal by Fraunhofer HHI (HEVC compatible; configuration A)," ISO/IEC JTC1/SC29/WG11 MPEG2011/M22570, Geneva, Switzerland, Nov. 2011, 48 pp.

Schwarz, et al., "Description of 3D Video Technology Proposal by Fraunhofer HHI (HEVC compatible, configuration B)", MPEG Meeting; Nov. 2011; Geneva; (Motion Picture Expert Group or ISO/IEC JTC1/SC29/WG11), No. m22571, XP030051134; 48 pp.

Flynn, et al., "Range Extensions Draft 4," JCT-VC Meeting; Apr. 18-26, 2013, Vienna, (Joint Collaborative Team on Video Coding of ISO/IEC JTC1/SC29/WG11 and ITU-T SG.16 ); URL: http://wftp3.itu.int/av-arch/jctvc-site/, No. JCTVC-N1005-v3, XP030114950, 321 pp.

Pu et al., "Non RCE1: Inter Color Component Residual Prediction", JCT-VC Meeting; Jul. 25-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0266-v7, XP030114791, 7 pp.

Dai et al., "RCE1: Adaptive Color Transforms for Range Extensions", JCT-VC Meeting; MPEG Meeting; Apr. 18-28, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0048, XP030114005, 9 pp.

Gershikov et al., "Optimal Color Spaces for Image Demosaicing",Image Processing (ICIP), 2009 16th IEEE International Conference on, IEEE, Piscataway, NJ, USA, Nov. 2009; pp. 1621-1624, XP931628108, ISBN: 978-1-4244-5653-6.

Marpe et al., "Macroblock-Adaptive Residual Color Space Transforms for 4:4:4 Video Coding", Image Processing, 2006 IEEE International Conference on, IEEE, PI, Oct. 1, 2006, pp. 3157-3160, XP031049347, ISBN: 978-1-4244-0480-3.

Topiwala: "Coding of 4:4:4 Video in Professional Extension", JVT Meeting; Sep. 2-5, 2003; San Diego, US; (Joint Videoteam of ISO/IEC JTC1/SC29/WG11 and ITU-T SG.16),,No. JVT-I015r7, XP030005752, 16 pp.

Nguyen, et al., "Non-RCE1/Non-RCE2/AHG5/AHG8: AdaptiveInter-Plane Prediction for RGB Content" , MPEG Meeting; Apr. 18-26, 2013; Incheon; (Motion Picture Expert Group or ISO/IEC JTC1/SC29/WG11), No. m28687, Document: JCTVC-M0230, XP030057220, 6 pp.

Kawamura, et al., "Chroma intra prediction based on residual luma samples in 4:2:2 chroma format", JCT-VC Meeting; MPEG Meeting; Jul. 11-20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J0358, XP030112720, 3 pp.

Kawamura et al., "Chroma intra prediction based on residual luma samples", JCT-VC Meeting; MPEG Meeting; Jul. 14-22, 2011; Torino; (Joint Collaborative Team on Video Coding of ISO/IEC JTC1/SC29/WG11 and ITU-T SG.16); URL:http://wftp3.itu.int/av-arch/jctvc-site/,No. JCTVC-F095, XP030009118, 4 pp.

Kawamura et al., "RCE1: Results of Inter-plane intra coding of residual signals", JCT-VC Meeting; MPEG Meeting; Apr. 18-26, 2013; Incheon; (Joint Collaborative Team on Video Coding of ISO/IEC JTC1/SC29/WG11 and ITU-T SG.16); URL: http://wftp3.itu.int/av-arch/jctvc-site/, No. JCTVC-M0410, XP030114367, 4 pp.

Nguyen, et al., "Non-RCE1/Non-RCE2/AHG5/AHG8: AdaptiveInter-Plane Prediction for RGB Content", MPEG Meeting; Apr. 18-26, 2013; Incheon; (Motion Picture Expert Group or ISO/IEC JTC1/SC29/WG11), No. m28687, XP030057220, 6 pp.

International Search Report and Written Opinion from International Application No. PCT/US2014/046713, dated Sep. 25, 2014, 12 pp.

Response to Written Opinion dated Sep. 25, 2014, from International Application No. PCT/US2014/046713, filed on May 12, 2015, 7 pp.

Second Written Opinion from International Application No. PCT/US2014/046713, dated Aug. 17, 2015, 10 pp.

Response to Second Written Opinion dated Aug. 17, 2015, from International Application No. PCT/US2014/046713, filed on Oct. 16, 2015, 15 pp.

International Preliminary Report from International Application No. PCT/US2014/046713, dated Nov. 2, 2015, 11 pp.

(56) References Cited

OTHER PUBLICATIONS

Flynn, et al., "High Efficiency Video Coding (HEVC) Range Extensions text specification: Draft 7," (Joint Collaborative Team on Video Coding of ISO/IEC JTC1/SC29/WG11 and ITU-T SG.16); Mar. 27-Apr. 4, 2014, Document: JCTVC-Q1005_v7, 352 pp.

Chen et al., "CE6.A.4: Chroma intra prediction by reconstructed luma samples", Mar. 10, 2011, No. JCTVC-E266, Mar. 10, 2011, XP030008772, 7 pp.

Topiwala, et al., "New Invertible Integer Color Transforms Based on Lifting Steps and Coding of 4:4:4 Video," (Joimt Collaborative Team on Video Coding of ISO/IEC JTC1/SC29/G11 and ITU-T SG.16); 9th Meeting; Sep. 2-5, 2003, Document: JVT-I015d4r1, 15 pp.

Malvar, et al., "YCoCg-R: A Color Space with RGB Reversibly and Low Dynamic Range," (Joint Collaborative Team on Video Coding of ISO/IEC JTC1/SC29/WG11 and ITU-T SG.16); Jul. 22-24, 2003 Document: JVT-I014r3, 8 pp.

Pu, et al., "Non-RCE1: Inter Color Component Residual Prediction," (Joint Collaborative Team on Video Coding of ISO/IEC JTC1/SC29/WG11 and ITU-T SG.16); Document: JCTVC-N0266, Version 1, Jul. 25-Aug. 2, 2013, 4 pp.

\* cited by examiner

INTER-COLOR COMPONENT RESIDUAL PREDICTION

This application claims priority to U.S. Patent Application No. 61/846,581, filed on Jul. 15, 2013, and U.S. Patent Application No. 61/847,839, filed on Jul. 18, 2013, each of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, such as the scalable video coding (SVC), multiview video coding (MVC), and Range Extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding tree units (CTUs), coding units (CUs) and/or coding nodes. Video blocks may include luma blocks and chroma blocks. In an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients may be entropy coded to achieve even more compression.

SUMMARY

In general, this disclosure describes techniques related to inter-color component residual prediction. The techniques may be used for predicting a block of residual chroma samples based at least in part on a block of luma residual samples. In one example, the techniques of this disclosure may be directed to techniques for cross-color component residual prediction. For instance, techniques of this disclosure may be directed to an encoder configured to determine a scale factor and a block of residual luma samples. The video encoder scales the luma samples by multiplying the scale factor with the residual luma samples to produce scaled residual luma samples. The video encoder subtracts the scaled residual luma samples from a block of residual chroma samples to form predictive residual samples. A video decoder may receive the block of predictive residual chroma samples, the residual luma samples, and the scale factor. The video decoder may scale the residual luma samples to form scaled residual luma samples. The video decoder may also add the scaled residual luma samples with the predictive residual chroma samples to form a block of updated residual chroma samples. The video coder may use the updated residual chroma samples to determine the final pixel samples of the block.

In other examples, this disclosure may be directed to techniques for determining a scale factor for a block of chroma residual samples of a first channel from a corresponding block of luma residual samples and a corresponding block of residual chroma samples of a second, different channel.

In one example, a method of decoding video data includes determining luma residual samples for a block of video data, determining predictive chroma residual samples for the block of video data, scaling the luma residual samples with a scale factor to produce scaled luma residual samples, and determining updated chroma residual samples based on the predictive chroma residual samples and the scaled luma residual samples.

In another example, a method of encoding video includes determining luma residual samples for a block of video data, determining chroma residual samples for the block of video data, scaling the luma residual samples with a scale factor to produce scaled luma residual samples, determining predictive chroma residual samples for the block of video data based on the chroma residual samples and the scaled luma residual samples, and encoding the predictive chroma residual samples and the luma residual samples.

In another example, a device for decoding video includes a memory configured to store video data, and at least one processor configured to: determine luma residual samples for a block of video data, determine predictive chroma residual samples for the block of video data, scale the luma residual samples with a scale factor to produce scaled luma residual samples, and determine updated chroma residual samples based on the predictive chroma residual samples and the scaled luma residual samples.

In another example, a device for encoding video includes a memory configured to store video data, and at least one processor configured to: determine luma residual samples for a block of video data, determine chroma residual samples for the block of video data, scale the luma residual samples with a scale factor to produce scaled luma residual samples, determine predictive chroma residual samples for the block of video data based on the chroma residual samples and the scaled luma residual samples, and encode the predictive chroma residual samples and the luma residual samples.

In another example, a device for decoding video data includes means for determining luma residual samples for a block of video data, means for determining predictive chroma residual samples for the block of video data, means for scaling the luma residual samples with a scale factor to produce scaled luma residual samples, and means for determining updated chroma residual samples based on the predictive chroma residual samples and the scaled luma residual samples.

In another example, a device for encoding video data includes means for determining luma residual samples for a block of video data, means for determining chroma residual samples for the block of video data, means for scaling the luma residual samples with a scale factor to produce scaled luma residual samples, means for determining predictive chroma residual samples for the block of video data based on the chroma residual samples and the scaled luma residual samples, and means for encoding the predictive chroma residual samples and the luma residual samples.

In another example, a computer-readable medium includes instructions stored thereon that, when executed, cause at least one processor to: determine luma residual samples for a block of video data, determine predictive chroma residual samples for the block of video data, scale the luma residual samples with a scale factor to produce scaled luma residual samples, and determine updated chroma residual samples based on the predictive chroma residual samples and the scaled luma residual samples.

In another example, a computer-readable medium includes instructions stored thereon that, when executed, cause at least one processor to: determine luma residual samples for a block of video data, determine chroma residual samples for the block of video data, scale the luma residual samples with a scale factor to produce scaled luma residual samples, determine predictive chroma residual samples for the block of video data based on the chroma residual samples and the scaled luma residual samples; and encode the predictive chroma residual samples and the luma residual samples.

The details of one or more examples are set forth in the accompanying drawings and the description below. Other features, objects, and advantages will be apparent from the description and drawings, and from the claims.

DETAILED DESCRIPTION

Figure 1:
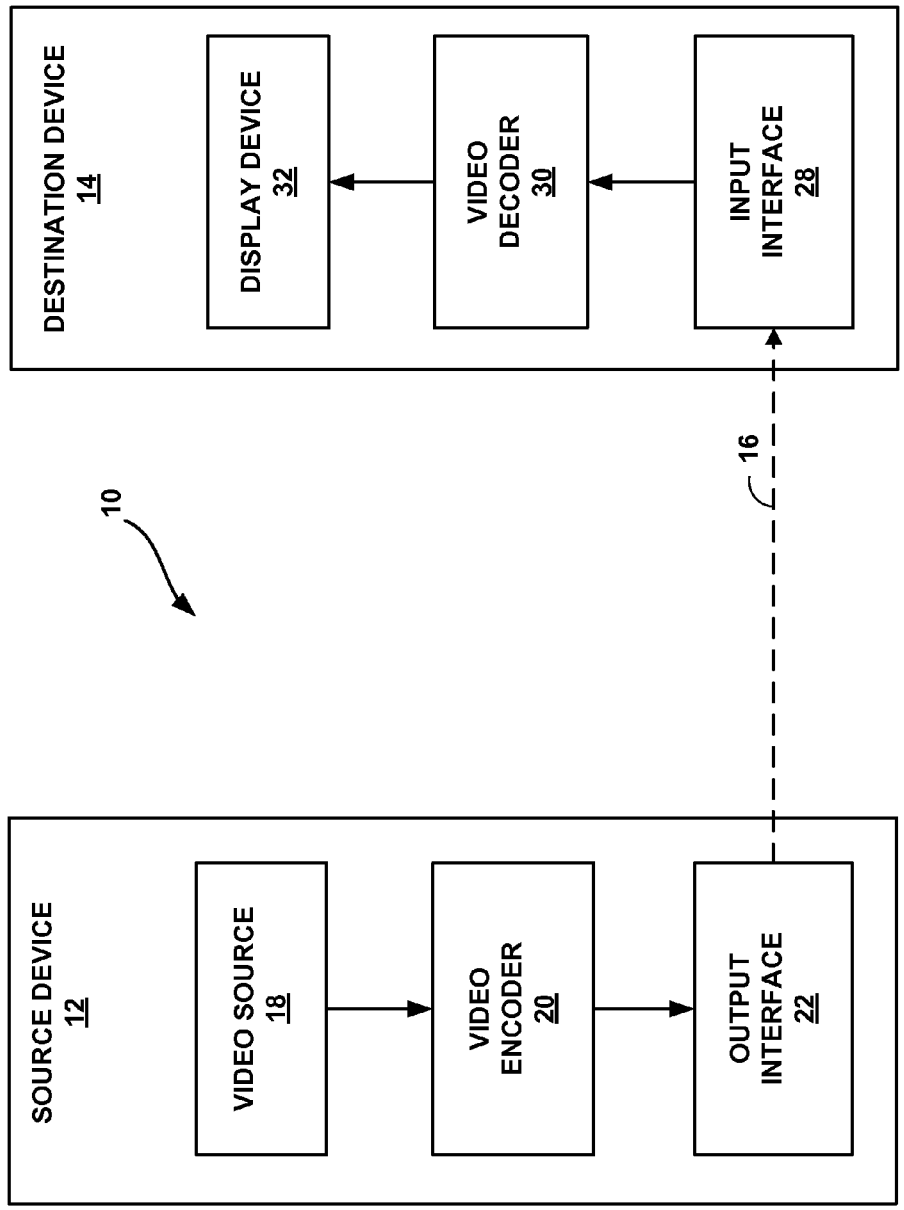
FIG. 1 is a block diagram illustrating an example video encoding and decoding system that may perform techniques for inter-color component residual prediction in accordance with one or more aspects of this disclosure.

A video coder (i.e. a video encoder or decoder) is generally configured to code a video sequence, which is generally represented as a sequence of pictures. Typically, the video coder uses block-based coding techniques to code each of the sequences of pictures. As part of block-based video coding, the video coder divides each picture of a video sequence into blocks of data. The video coder individually codes (i.e. encodes or decodes) each of the blocks. Encoding a block of video data generally involves encoding an original block of data by generating one or more predictive blocks for the original block, and a residual block that corresponds to differences between the original block and the one or more predictive blocks. Specifically, the original block of video data includes a matrix of pixel values, which are made up of one or more channels of "samples," and the predictive block includes a matrix of predicted pixel values, each of which are also made of predictive samples. Each sample of a residual block indicates a pixel value difference between a sample of a predictive block and a corresponding sample of the original block.

Prediction techniques for a block of video data are generally categorized as intra-prediction and inter-prediction. Intra-prediction (i.e., spatial prediction) generally involves predicting a block from pixel values of neighboring, previously coded blocks within the same picture. Inter-prediction generally involves predicting the block from pixel values of previously coded blocks in previously coded pictures.

The pixels of each block of video data each represent color in a particular format, referred to as a "color representation." Different video coding standards may use different color representations for blocks of video data. As one example, the main profile of the High Efficiency Video Coding (HEVC) video standard, which is under development by the Joint Collaborative Team on Video Coding (JCT-VC), uses the YCbCr color representation to represent the pixels of blocks of video data.

The YCbCr color representation generally refers to a color representation in which each pixel of video data is represented by three components or channels of color information, "Y," "Cb," and "Cr." The Y channel represents luminance (i.e., light intensity or brightness) data for a particular pixel. The Cb and Cr components are the blue-difference and red-difference chrominance, i.e., "chroma," components, respectively. YCbCr is often used to represent color in compressed video data because there is strong decorrelation between each of the Y, Cb, and Cr components, meaning that there is little data that is duplicated or redundant among each of the Y, Cb, and Cr components. Coding video data using the YCbCr color representation therefore offers good compression performance in many cases.

Additionally, many video coding techniques utilize a technique, referred to as "chroma subsampling" to further improve compression of color data. Chroma sub-sampling of video data having a YCbCr color representation reduces the number of chroma values that are signaled in a coded video bitstream by selectively omitting chroma components according to a pattern. In a block of chroma sub-sampled video data, there is generally a luma value for each pixel of the block. However, the Cb and Cr components may only be signaled for some of the pixels of the block, such that the chroma components are sub-sampled relative to the luma component.

A video coder (which may refer to a video encoder or a video decoder) interpolates Cb and Cr components for pixels where the Cb and Cr values are not explicitly signaled for chroma sub-sampled blocks of pixels. Chroma sub-sampling works well to reduce the amount of chrominance data without introducing distortion in blocks of pixels that are more uniform. Chroma sub-sampling works less well to represent video data having widely differing chroma values, and may introduce large amounts of distortion in those cases.

The HEVC Range Extension, which is an extension to the HEVC standard, adds support to HEVC for additional color representations (also referred to as "color formats"), as well as for increased color bit-depth. One recent draft of the HEVC Range Extension is: "HEVC Range Extension text specification: Draft 7," "17$^{th}$ Meeting: Valencia, ES, 27 Mar.-4 Apr. 2014, JCTVC-Q 1005_v7, 242 pp.," and is available from http://phenix.int-evry.fr/jct/doc_end_user/documents/17_Valencia/wg11/JCTVC-Q1005-v9.zipA
Color bit-depth is the number of bits used to represent each component of a color representation. The support for other color formats may include support for encoding and decoding RGB sources of video data, as well as video data having other color representations and using different chroma subsampling patterns than the HEVC main profile. A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, which is downloadable from: http://phenix.int-evry.fr/jct/doc_end_user/documents/12_Geneva/wg11/JCTVC-L1003-v34.zip.

As mentioned above, the HEVC main profile uses YCbCr because of the strong color decorrelation between the luma component, and the two chroma components of the color representation (also referred to as a color format). In many cases however, there may still be strong correlations among Y, Cb, and Cr components. The correlations between components of a color representation may be referred to as cross-color component correlation or inter-color component correlation.

The techniques of this disclosure may exploit the correlation between samples in the residual domain. A video coder (i.e. a video encoder or a video decoder) configured in accordance with the techniques of this disclosure may be configured to determine blocks of chroma residual samples from predictors of blocks of chroma residual samples and blocks of luma residual samples that correspond to each other. In some examples, an updated block of chroma residual values may be determined based on a predictor for the block of chroma residual samples and a corresponding block of luma residual samples. The block of luma residual samples may be modified with a scale factor and/or an offset.

The techniques of this disclosure may enable a video coder to form chroma residual samples based on luma residual samples using the same bitstream parser used for both chroma residual samples and luma residual samples, which may alleviate synchronization problems otherwise associated with predicting chroma samples from luma samples. Additionally, the techniques of this disclosure may reduce bandwidth and requirements associated with predicting chroma samples based on luma samples.

One or more examples of this disclosure may be directed to inter-color component residual prediction techniques that may utilize YCbCr chroma YCbCr 4:4:4 and/or YCbCr 4:2:2 chroma subsampling formats. However, a video coder configured in accordance with the techniques of this disclosure may process blocks of other color formats, such as blocks having an RGB color format in a similar way as YCbCr 4:4:4 using the techniques disclosed herein.

The HEVC video coding standard defines a tree-like structure that defines blocks of video data. The techniques of this disclosure may apply to a variety of different components of the HEVC tree-like structure. In HEVC, a video coder breaks a coded picture (also referred to as a "frame") into blocks based on the tree structure. Such blocks may be referred to as treeblocks. In some instances, a treeblock may also be referred to as a largest coding unit (LCU). The treeblocks of HEVC may be roughly analogous to macroblocks of previous video coding standards, such as H.264/AVC. However, unlike the macroblocks of some video coding standards, treeblocks are not limited to a certain size (e.g. a certain number of pixels). Treeblocks may include one or more coding units (CUs), which may be recursively divided into sub-coding units (sub-CUs).

Each CU may include one or more transform units (TUs). Each TU may include residual data that has been transformed. In addition, each CU may include one or more prediction units (PUs). A PU includes information related to the prediction mode of the CU. The techniques of this disclosure may apply to blocks, such as one or more of an LCU, CU, sub-CU, PU, TU, macroblocks, macroblock partitions, sub-macroblocks, or other types of blocks of video data.

During video encoding and decoding a video coder may determine a predictive block of video data using inter- or intra-prediction. Based on the predictive block of video data, a video coder may determine a residual block of video data, which may include differences between the predictive block and the corresponding samples of an original video block, e.g., on the encoder side. On the decoder side, the residual block of video data includes differences between the predictive block and the corresponding samples of the final video block that are output for display. In particular, the residual block of video data may be added to the predictive block to reconstruct the original block of video data.

During video decoding, a video decoder may determine a predictive block that is similar to the current block to be decoded. A PU may include the predictive block, which may further comprise predictive blocks of luma and chroma samples. The video decoder may also receive, in a coded video bitstream, a TU comprising transformed residual blocks of video data, such as transformed luma residual blocks and chroma residual blocks. In particular, a TU may include transform coefficients that represent the residual data. An inverse transform may be applied by the video decoder to the transform coefficients to reproduce the residual block of data. As discussed above, the residual blocks of video data represent the differences between a block that the decoder outputs for display, and the predictive block. To reconstruct a block for output, a video decoder may combine the inversely-transformed TU samples with the corresponding PU samples.

A video coder may perform the techniques of this disclosure after the video coder finishes parsing and inversely transforming any blocks of transform coefficients to obtain residual luma and chroma residual blocks. In this disclosure, a block of luma residual samples is denoted as:

$$R_L(x,y).$$

The block of luma residual samples may be obtained by a video decoder by inverse transforming a corresponding block of transform coefficients for a luma residual block. The video decoder may use this block of luma residual samples to reconstruct a luma block. For example, the video decoder may sum the pixel difference values provided by luma residual samples with corresponding predictive luma pixel samples to reconstruct a block of luma pixel samples.

A predictor of a block of chroma residual samples likewise may be obtained by the video decoder by inverse transforming a corresponding block of transform coefficients for a chroma residual block. A final or updated residual block of chroma residual samples is denoted as:

$R_C(x,y)$.

The video decoder may use this final or updated block of chroma residual samples to reconstruct a chroma block. For example, the video decoder may sum the pixel difference values provided by final or updated block of chroma residual samples with corresponding predictive chroma pixel samples to reconstruct a block of chroma pixel samples. This disclosure also introduces the concept of a predictive block of chroma residual samples, denoted as:

$R_{Cp}(x,y)$.

The predictive block of chroma residual samples may include residual samples that represent a difference between the final or updated chroma residual samples and a version of the luma residual samples, e.g., such as a version that is scaled with a scale factor and/or offset with an offset value relative to the luma residual samples, e.g., as indicated in the equations 1-9 below.

A video encoder may encode and a video decoder may decode, the block of luma residual values and the predictive block of chroma residual samples, and one or more scaling or offset values. The video decoder may determine the final or updated block of chroma residual samples based on the predictive block of chroma residual samples and a version of the block of luma residual samples, e.g., such as a scaled and/or offset version of the block of luma residual samples.

The video decoder may use the final or updated block of chroma residual samples to reconstruct a block of chroma pixel samples. For example, the video decoder may sum the final or updated block of chroma residual samples with a block of predictive chroma pixel samples to reconstruct a block of chroma pixel samples. The video encoder may determine and encode the predictive block of chroma residual samples by subtracting a version of the block of luma residual samples, such as a scaled or offset version of the block of luma residual samples, from an original block of chroma residual samples. For each of the blocks of luma or chroma samples described above, x and y denote variables that indicate the pixel location in the picture of the block relative to the top-left corner of a frame of video, also referred to as a picture.

A video encoder configured accordance with the techniques of this disclosure may be configured to determine a scale factor for one or more coding blocks of a coding unit (CU) of video data. The scale factor may indicate a correlation between the residual luma block and a residual chroma block of a PU of the CU. In some examples, the video encoder may utilize the scale factor to determine to apply to the residual luma block to produce scaled residual luma samples. The video encoder may subtract the scaled residual luma samples from a block of original residual chroma samples to produce a block of predictive residual samples.

The video encoder may encode the scale factor, as well as the predictive block of chroma residual samples in a coded video bitstream. Encoding the predictive block of chroma residual samples, the residual luma samples, and the scale factor may improve the bitstream efficiency of coding residual chroma samples relative to encoding the original block of residual chroma samples.

In a reciprocal process, a video decoder configured in accordance with the techniques of this disclosure may receive in a coded video bitstream: a scale factor, a block of residual luma samples, and a predictive block of residual chroma samples for a CU. In some examples, the video decoder may multiply the scale factor against each of the samples of the block of residual luma samples, and quantize the resulting product to produce quantized residual luma samples. The video decoder may then update the predictive block of residual chroma samples by summing or combining the quantized residual luma samples resulting from the scaling and quantizing operations with the predictive block of residual chroma samples to produce an updated block of residual chroma samples, which may be consider a final block of chroma residual samples. The video decoder may use the updated block of chroma residual samples in combination with predictive chroma pixel samples to determine the final pixel values of the CU. The video decoder may receive different scale factors for different chroma components in some examples.

In some examples, the video coder may also determine or receive an offset value. A video decoder may receive the offset in the coded video bitstream and add the offset value to the scaled residual luma samples and the predictive residual chroma samples to produce the updated residual chroma samples. A video encoder may determine the offset value, and subtract the offset value and the scaled residual luma samples from a block of residual chroma samples to determine a block of predictive residual chroma samples. The video encoder may encode the offset value, in addition to the scale factor, the residual luma samples, and the predictive residual chroma samples in the coded video bitstream.

The process described above with respect to determining a scale factor, residual chroma samples, updated luma samples, and updated chroma samples may apply to both chroma components (Cb and Cr). That is, a video coder may use the same process, and may determine different scale factors for each component, when predicting/determining each chroma component.

FIG. 1 is a block diagram illustrating an example video encoding and decoding system that may perform techniques for inter-component residual prediction in accordance with one or more aspects of this disclosure.

As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In accordance with the one or more examples of this disclosure, video encoder 20 of source device 12 may be configured to determine luma residual samples for a block of video data, and determine predictive chroma residual samples for the block of video data. Video encoder 20 may be further configured to scale the luma residual samples with a scale factor to produce scaled luma residual samples, and determine updated chroma residual samples based on the predictive chroma residual samples and the scaled luma residual samples.

In a reciprocal manner, video decoder 30 may be configured to determine luma residual samples for a block of video data, and determine chroma residual samples for the block of video data. Video decoder 30 may be further configured to scale the luma residual samples with a scale factor to produce scaled luma residual samples, determine predictive chroma residual samples for the block of video data based on the chroma residual samples and the scaled luma residual samples, and encode the predictive chroma residual samples and the luma residual samples.

Source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In some examples, output interface 22 may output encoded data to a storage device. Similarly, input interface 28 may access encoded data from the storage device. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device (e.g., via streaming or download). The file server may be any type of server capable of storing encoded video data and transmitting that encoded video data to destination device 14. Example file servers include a web server (e.g., for a website), an FTP server, network attached storage (NAS) devices, a Hypertext Transfer Protocol (HTTP) streaming server, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

System 10 of FIG. 1 is merely one example. Techniques for inter-color component residual prediction may be performed by any digital video encoding and/or decoding device. A video encoder/decoder, referred to as a "CODEC" may generally perform one or more of the techniques of this disclosure. Moreover, a video preprocessor may perform the techniques of this disclosure. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. In some examples, video source 18 generates computer graphics-based data as the source video, or a combination of live video, archived video, and computer-generated video. In some cases, video source 18 may be a video camera. In some examples, video source 18 may be a video camera. In some examples, source device 12 and destination device 14 may be so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. Output interface 22 may output the encoded video information onto computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In the example of FIG. 1, input interface 28 of destination device 14 receives information from computer-readable medium 16. The information of computer-readable medium 16 may include syntax information defined by video encoder 20 that includes syntax elements that describe characteristics and/or processing of blocks and other coded units, e.g., GOPs. Display device 32 displays decoded video data to a user. Display device 32 may comprise any of a variety of display devices such as a cathode ray tube (CRT) display, a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, as well as the HEVC Range Extension, developed by the Joint Collaborative Team on Video Coding (JCT-VC). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques of this disclosure are implemented partially in software, a device may store instructions for the software in a suitable non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks of samples included in a CU, and within individual video slices in order to encode the video data.

The HEVC standard specifies that a video frame or picture may be divided into a sequence of treeblocks (i.e., largest coding units (LCUs) or "coding tree units" (CTUs)). Treeblocks may include luma and/or chroma samples. Syntax data within a bitstream may define a size for the LCUs, which are largest coding units in terms of the number of pixels. In some examples, each of the CTUs comprises a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A video frame or picture may be partitioned into one or more slices. A slice includes a number of consecutive treeblocks in a coding order (e.g., a raster scan order).

Each treeblock may be split into one or more coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, the CU is referred to as a leaf-CU.

Video encoder 20 may recursively perform quad-tree partitioning on the coding tree blocks of a CTU to divide the coding tree blocks into coding blocks, hence the name "coding tree units." A coding block may be an N×N block of samples. In some examples, a CU comprises a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, which may further include one or more prediction units (PUs), or transform units (TUs), in the context of HEVC, or similar data structures in the context of other standards (e.g., macroblocks and sub-blocks thereof in H.264/AVC).

A CU includes one or more prediction units (PUs) and one or more transform units (TUs). A size of the CU corresponds may be square or rectangular in shape. The size of the CU may range from 8×8 pixels up to the size of the treeblock with a maximum of 64×64 pixels or greater. Syntax data associated with a CU may describe, for example, partitioning of the CU into one or more PUs. Partitioning modes may differ between whether the CU is skip or direct mode encoded, intra-prediction mode encoded, or inter-prediction mode encoded. A CU may be partitioned such that PUs of the CU may be non-square in shape. Syntax data associated with a CU may also describe, for example, partitioning of the CU into one or more TUs according to a quadtree.

Video encoder 20 may partition a coding block of a CU into one or more prediction blocks. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that has three separate color planes, a PU may comprise a single prediction block and syntax structures used to predict the prediction block samples.

A transform block may be a rectangular block of samples on which the same transform is applied. A transform unit (TU) of a CU may comprise a transform block of luma samples, two corresponding transform blocks of chroma samples, and syntax structures used to transform the transform block samples. Thus, for a CU that is formatted with a YCbCr color space, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In a monochrome picture or a picture that has three separate color planes, a TU may comprise a single transform block and syntax structures used to transform the transform block samples. A TU can be square or non-square (e.g., rectangular) in shape. In other words, a transform block corresponding to a TU may be square or non-square in shape.

As one example, video encoder 20 and decoder 30 may restrict inter-color component residual prediction techniques described herein to blocks and/or CUs having a certain (minimum) size. Blocks not meeting the minimum size, in terms of number of pixel samples, may not have inter-color component residual prediction enabled. Requiring blocks to have a minimum size may reduce signaling overhead associated with signaling scale factors or other information for inter-color component residual prediction. In some examples, video encoder 20 and video decoder 30 may require a minimum size of a chroma block to be used when performing inter-color residual to be 8×8 samples or above.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

In general, a PU represents a spatial area corresponding to all or a portion of the corresponding CU, and may include data for retrieving a reference sample for the PU. Moreover, a PU includes data related to prediction. In some examples, a PU may be encoded using intra mode or inter mode. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In performing inter-color component residual prediction as described in various examples of this disclosure, video encoder 20 and video decoder 30 may be configured to include one or more different features.

As indicated above, a leaf-CU having one or more PUs may also include one or more TUs. The TUs may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as RQTs. That is, a leaf-CU may include a quadtree indicating how the leaf-CU is partitioned into TUs. The root node of a TU quadtree generally corresponds to a leaf-CU, while the root node of a CU quadtree generally corresponds to a treeblock. TUs of the RQT that are not split are referred to as leaf-TUs. In general, this disclosure uses the terms CU and TU to refer to leaf-CU and leaf-TU, respectively, unless noted otherwise.

Both PUs and TUs may contain (i.e., correspond to) one or more blocks of samples corresponding to each of the channels of the color space associated with that block. Blocks of the PUs may include samples of a predictive block, and blocks of the TUs may blocks that include residual samples corresponding to the difference between the original block and the predictive block.

As an example, HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N. N×2N, or N×N. HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

During motion compensation (described elsewhere in this document), intra- and/or inter-prediction, video encoder 20 and video decoder 30 may be configured to perform inter-color component residual prediction. During inter-component residual prediction, video encoder 20 may determine a predictive residual block that is used to predict the residual samples of a current block. The predictive block may comprise a block of residual chroma samples. Video encoder 20 may further utilize residual samples of a first component to generate the residual samples of a block of a second, different component based on a correlation between samples of the first component (e.g., luma) and the second component (e.g., Cb or Cr).

If a CU is intra-predicted, a chroma block of the CU may have a different intra prediction mode, as compared to the luma component. When the luma and chroma components have different intra-prediction modes, the correlation between their residual signals be weak. In some examples, video encoder 20 and video decoder 30 may only enable inter-color component residual prediction if a luma samples block and a chroma samples block have a same intra-prediction mode. An intra-coded CU may include a syntax element, intra_chroma_pred_mode[x0][y0], which may indicate the intra-prediction mode for the CU.

More particularly, video encoder 20 and video decoder 30 may only enable inter-component residual prediction if the chroma and luma samples of a block have a same intra-prediction direction, e.g., a same angular intra-prediction direction. Similarly, video encoder 20 and video decoder 30 may determine whether inter-component residual prediction is enabled for a particular block based on whether chroma samples and luma samples for a block have the same intra-prediction mode or intra-prediction direction. In some examples, video encoder 20 and video decoder 30 may enable intra-color component residual prediction if intra_chroma_pred_mode[xCb][yCb]==4, which indicates that a chroma block of a CU uses angular intra-prediction.

As an example, video encoder 20 may determine a scale factor ($\alpha$), based on a correlation between a block of luma residual samples and a block of chroma residual samples. Video encoder 20 may determine a rate-distortion cost associated with a scale factor equal to zero. Video encoder 20 may then determine a list of scale factor candidates, and select the scale factor value from the list of candidates such that the selected candidate scale factor for a block minimizes a squared error for the block. Video encoder 20 may calculate the squared error as: (chroma_residuals−luma_residuals*alpha)$^2$, wherein chroma_residuals denotes a residual chroma block, and luma_residuals denotes a residual luma block. Video encoder 20 may select either a scale factor equal to zero, or the candidate scale factor from the list such that the selected zero scale factor or list scale factor minimizes a rate-distortion cost.

In some examples, video encoder 20 may select the sale factor from nine possible candidate scale factors: {−8, −4, −2, −1, 0, 1, 2, 4, 8} such that the selected scale factor minimizes a rate-distortion cost. During intra- or inter-prediction, video encoder 20 may calculate a predictive block of chroma residual samples for a CU based on the scale factor and the block of luma residual samples, and signal the predictive block and the scale factor in a coded video bitstream. Video decoder 30 may decode the scale factor, the predictive block of chroma residual samples, and the block of luma residual samples, and may use the scale factor, the predictive block of chroma residual samples, and the block of luma residual samples to determine an updated block of chroma residual samples.

In some examples in accordance with the techniques of this disclosure, video encoder 20 may multiply the scale factor by the block of luma residual samples to produce a block of scaled luma residual samples. Video encoder 20 may then quantize the residual block of luma samples to produce a block of quantized and scaled luma residual samples. Video encoder 20 may subtract the quantized residual block of luma from the residual block of chroma samples to generate a predictive block of chroma samples.

In a generally reciprocal manner in accordance with the techniques of this disclosure, video decoder 30 may receive the scaling factor, the residual luma samples, and the predictive residual chroma samples. Video decoder 30 may multiply the scale factor by the block of luma residual samples to produce a block of scaled luma residual samples. Video decoder 30 may then quantize the scaled residual block of luma samples to produce a quantized residual block of quantized and scaled luma residual samples. Video decoder 30 may add the block of quantized and scaled luma residual samples to the a predictive block of chroma residual samples to produce a final or updated block of chroma residual samples.

In some examples where a CU has a YCbCr 4:4:4 chroma subsampling format, video decoder 30 may calculate an updated block of chroma samples as in equation 1:

$$R_C(x,y)=R_{Cp}(x,y)+(\alpha \cdot R_L(x,y))>>N \qquad (1),$$

where $R_c$ is the updated residual block of luma samples, and $R_{cp}$ is the predictor block of chroma residual samples, $\alpha$ is a scale factor, and $R_L$ is the luma residual block of samples. In this example, N is a non-negative integer constant parameter, a is an integer scale factor parameter signaled in the bitstream. Video decoder 30 may utilize the right shift operation (">>") to quantize a, e.g., to ensure that the resulting offset value is an integer value, as well as to reduce computational complexity. Video decoder 30 may also apply other quantization schemes to quantize the product of the residual luma samples and the scale factor.

In some examples, where a CU has a YCbCr 4:4:4 chroma subsampling format, video encoder 20 configured in accordance with the techniques of this disclosure may apply a process that is generally reciprocal to that described in equation 1 to calculate a predictive chroma residual sample block. For example, video encoder 20 may calculate the residual chroma predictive block according to equation 2:

$$R_{Cp}(x,y)=R_C(x,y)-(\alpha \cdot R_L(x,y))>>N \qquad (2),$$

where $R_{cp}$ on the left-hand side of equation 2 is the predictive residual block of chroma samples, and $R_c$ is a block of original or updated residual chroma samples.

In some further examples, video encoder 20 may be further configured to calculate an offset value and encode the additional offset value in a coded video bitstream. Video encoder 20 may subtract the offset value from a block of residual chroma samples to calculate a block of predictive residual chroma samples according to the following equation (3):

$$R_{Cp}(x,y)=R_C(x,y)-b-(\alpha \cdot R_L(x,y))>>N \qquad (3),$$

where b is the offset value.

In some examples, video decoder 30 may perform a generally reciprocal process when a CU has a 4:4:4 chroma subsampling. In these examples, video decoder 30 may receive an offset value, a scale factor, a block of predictive residual chroma samples, and residual luma samples of the block. Video decoder 30 may calculate the updated residual chroma samples based on the aforementioned received syntax elements according to the following equation (4):

$$R_C(x,y) = R_{Cp}(x,y) + b + (\alpha \cdot R_L(x,y)) >> N \quad (4).$$

In various examples, a video coder may determine that a CU has a 4:2:2 chroma subsampling format. For a CU that has a 4:2:2 subsampling format, there are two luma samples for each corresponding Cb and Cr sample. In these examples, for each Cb or Cr TU block having a resolution of A×A samples, there is a luma TU block of samples having a resolution of (A/2)×A samples.

Responsive to determining that a CU has a 4:2:2 chroma subsampling format, video encoder 20 may calculate a block of predictive residual chroma samples ($R_{Cp}$) according to the following equation (5):

$$R_{Cp}(x,y) = R_C(x,y) - (\alpha \cdot R_L(x<<1,y)) >> N \quad (5),$$

In a reciprocal manner, responsive to determining that a CU has a 4:2:2 chroma subsampling format, video decoder 30 may calculate an updated (final) block of chroma samples according to the following equation (6):

$$R_C(x,y) = R_{Cp}(x,y) + (\alpha \cdot R_L(x<<1,y)) >> N \quad (6),$$

In the example of equation 6, "<<" indicates an arithmetic left-shift operation.

In some examples where a CU has a 4:2:2 chroma subsampling format, a video coder may be configured to utilize a filtered version of the residual luma samples to produce updated residual chroma samples or updated (final) residual luma samples. More particularly, in some examples, video encoder 20 and video decoder 30 may be configured to apply a 2-tap low pass smooth filter in order to produce filtered residual block luma samples, although it should be understood that video encoder 20 or video decoder 30 may utilize other filtering schemes. In some examples, video encoder 20 may be configured to calculate the predictive residual chroma samples according to the following equation:

$$R_{Cp}(x,y) = R_C(x,y) - (\alpha \cdot ((R_L(2x,y)) + R_L(2x+1,y))/2)) >> N \quad (7).$$

In a reciprocal fashion, responsive to determining that a CU has a 4:2:2 chroma subsampling format, video decoder 30 may calculate updated (final) chroma samples according to the following equation:

$$R_C(x,y) = R_{Cp}(x,y) + (\alpha \cdot ((R_L(2x,y)) + R_L(2x+1,y))/2)) >> N \quad (8).$$

In some examples, the scale factor alpha values between neighboring blocks may be correlated with each other. Video encoder 20 may be able to reduce the overhead of signaling the scale factor alpha values based on the correlation between the scale factors. In some examples, video encoder 20 may determine a scale factor for a first block or CU. Video encoder 20 may utilize the scale factor as a scale factor predictor, from which to predict the scale factor of a second block that neighbors the first block.

Video encoder 20 may signal only the difference between the predictive scale factor and the actual scale factor for the second block, which may reduce the signaling overhead of signaling the second scale factor. In some cases, video encoder 20 may calculate the scale factor predictor as the average of alpha values of a plurality of neighboring blocks. Video encoder 20 may also determine the scale factor predictor as the scale factor alpha value of a left-neighboring block relative to a current block.

Responsive to determining that a CU has a YCbCr 4:2:2 format, video encoder 20 and video decoder 30 may derive a scale factor for a first chroma component of a CU, and may derive a second scale factor for a second chroma component (e.g., Cr) based on the first scale factor. In this manner, two neighboring TU blocks having a YCbCr 4:2:2 format may share scale factors.

In a case where a CU has a 4:2:2 chroma subsampling format (e.g., YCbCr 4:2:2), one square luma reconstructed residual block L(x, y) corresponds to two square chroma original blocks, denoted by $C_0(x, y)$ and $C_1(x, y)$ respectively. If the width and height of the luma block are X and Y samples respectively, then the two square chroma blocks have dimensions (X/2)×(Y/2). To utilize the residual luma samples to predict or determine the first and second residual chroma blocks of samples, video encoder 20 or video decoder 30 may downsample the residual luma sample block to a resolution of (X/2)×Y samples. In these examples, the predictor for $C_0(x,y)$ and $C_1(x,y)$ are denoted as $P_0$ and $P_1$, respectively. The predicted residual block of chroma samples in these examples may be denoted as $P_0[C_0(x,y)]$ and $P_1[C_1(x,y)]$, respectively.

Video encoder 20 and video decoder 30 may derive the first scale factor, $\alpha_0$, for the first residual chroma block of samples, and use the first scale factor to determine the scale factor for the second residual chroma block of samples, $\alpha_1$, according to the following equation:

$$\alpha_1 = \alpha_0 - \frac{\Sigma(P_1[C_1(x, y)] - P_0[C_1(x, y)])L(x, y)}{\Sigma L^2(x, y)}. \quad (9)$$

In the example of the above equation, video encoder 20 and video decoder 30 may calculate the sum of differences of the predictive residual chroma blocks within the bottom block of the two blocks.

Following intra-predictive or inter-predictive coding using the PUs of a CU, video encoder 20 or video decoder 30 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 or video decoder 30 may form the TUs including the residual data for the CU, and then transform the TUs to produce transform coefficients for the CU. In other words, video encoder 20 may apply a transform to a transform block for a TU to generate a transform coefficient block for the TU. Video decoder 30 may apply an inverse transform to the transform coefficient block for the TU to reconstruct the transform block for the TU.

Following application of transforms (if any) to produce transform coefficients, video encoder 20 or video decoder 30 may perform quantization of the transform coefficients. In other words, video encoder 20 may quantize the transform coefficients of a transform coefficient block. Video decoder 30 may dequantize the transform coefficients of the transform coefficient block. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. Inverse quantization (i.e., dequantization) may increase the bit depths of some or all of the coefficients.

Following quantization, video encoder 20 may scan the transform coefficients, producing a one-dimensional vector from a two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 or video decoder 30 may utilize a predefined scan order to scan the quantized transform coefficients to produce a serialized vector that can be entropy encoded. In other examples, video encoder 20 or video decoder 30 may perform an adaptive scan. After scanning the quantized transform coefficients to form a one-dimensional vector, video encoder 20 or video decoder 30 may entropy encode the one-dimensional vector, e.g., according to context-adaptive binary arithmetic coding (CABAC), context-adaptive variable length coding (CAVLC), syntax-based context-adaptive binary arithmetic coding (SBAC), Probability Interval Partitioning Entropy (PIPE) coding or another entropy coding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in variable length coding (VLC) may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Accordingly, video encoder 20 represents an example of a video coder configured to determine luma residual samples for a block of video data, determine chroma residual samples for the block of video data, and scale the luma residual samples with a scale factor to produce scaled luma residual samples. Video encoder 20 may be further configured to determine predictive chroma residual samples for the block of video data based on the chroma residual samples and the scaled luma residual samples, and encode the predictive chroma residual samples and the luma residual samples.

Video decoder 30 represents an example of a video configured to determine luma residual samples for a block of video data, and determine chroma residual samples for the block of video data. Video decoder 30 may be further configured to scale the luma residual samples with a scale factor to produce scaled luma residual samples, scale the luma residual samples with a scale factor to produce scaled luma residual samples, and determine updated chroma residual samples based on the predictive chroma residual samples and the scaled luma residual samples.

Figure 2:
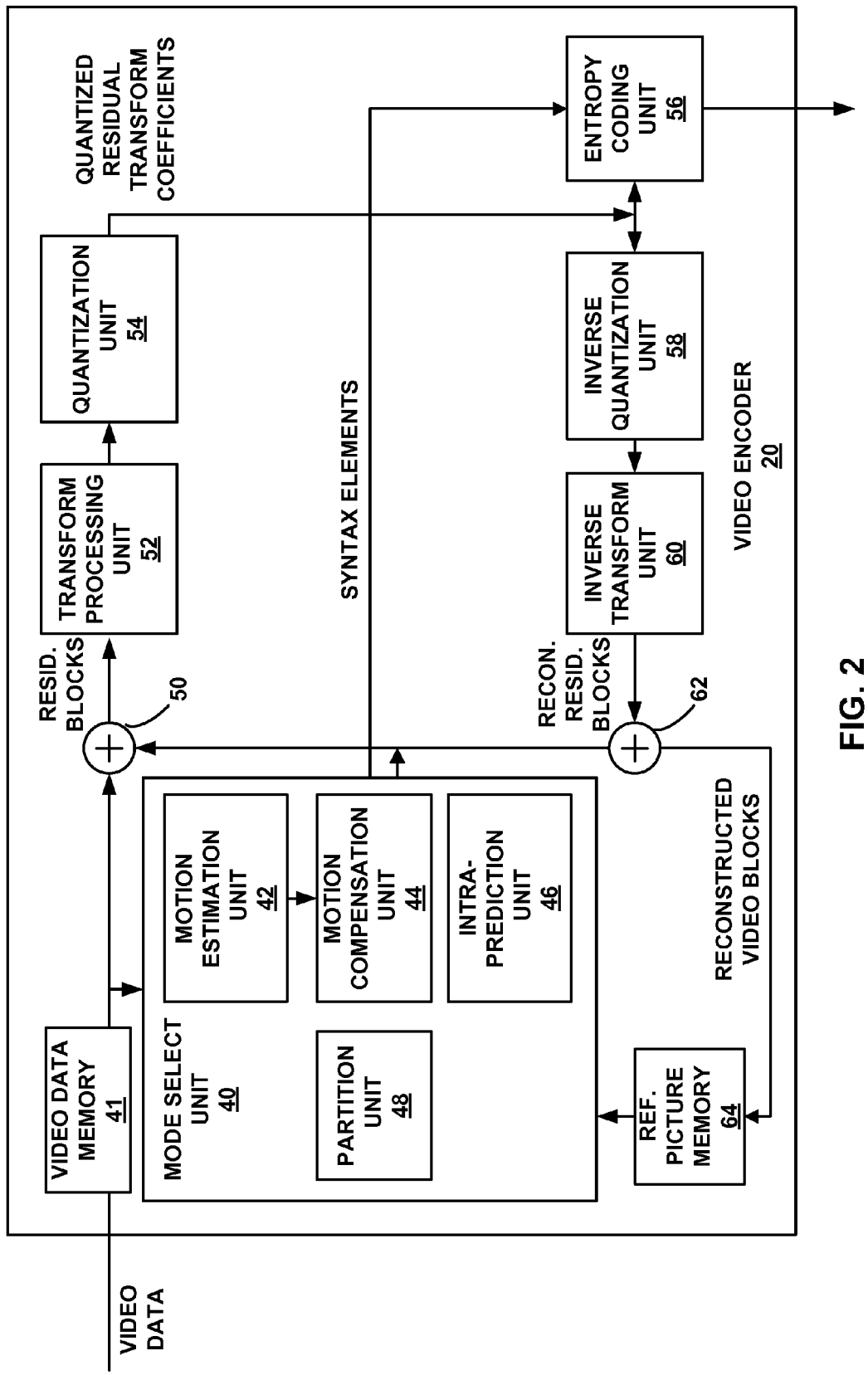
FIG. 2 is a block diagram illustrating an example of a video encoder that may perform techniques for inter-color component residual prediction in accordance with one or more aspects of this disclosure.

FIG. 2 is a block diagram illustrating an example of a video encoder that may perform techniques for inter-color component residual prediction in accordance with one or more aspects of this disclosure.

In the example of FIG. 2, video encoder 20 includes video data memory 41, mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter). In some examples, a deblocking filter may be used to generate a filtered block of luma samples for inter-color component prediction, as described above.

Video data memory 41 may store video data to be encoded by the components of video encoder 20. The video data stored in video data memory 41 may be obtained, for example, from video source 18. Reference picture memory 64 may be a reference picture memory that stores reference video data for use in encoding video data by video encoder 20, e.g., in intra- or inter-coding modes. Video data memory 41 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and reference picture memory 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. In this way, video encoder 20 may receive a current video block within a video frame to be encoded.

Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Summer 50 may form a residual video block by determining differences between pixel values of the predictive block from the pixel values of the current video block being coded. In some examples, summer 50 may determine not determine or encode a residual block.

Partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and may provide the resulting intra- or inter-coded block to summer 50. Summer 50 may generate residual block data. For instance, summer 50 may generate residual block data for a current CU such that each sample of the residual block data is equal to a difference between a sample in a coding block of the current CU and a corresponding sample of a prediction block of a PU of the current CU. Summer 62 may reconstruct the encoded block (i.e., the coding block) for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). In other words, a motion vector may indicate a displacement between a prediction block of a PU and a corresponding predictive block in a reference picture. A predictive block is a block that is found to closely match the block to be coded (i.e., the prediction block), in terms of pixel difference, which may be determined by sum of absolute difference (SAD), sum of square difference (SSD), or other difference metrics.

In some examples, video encoder 20 may calculate values for sub-integer pixel positions of reference pictures stored in reference picture memory 64. In other words, video encoder 20 may use apply one or more interpolation filters to samples of one or more reference pictures to generate samples in a predictive block of a PU. In some examples, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 may calculate a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. If motion estimation unit 42 has calculated a motion vector, motion estimation unit 42 may send the calculated motion vector to entropy encoding unit 56 and motion compensation unit 44.

Motion compensation unit 44 may perform motion compensation. Motion compensation may involve fetching or generating one or more predictive blocks for a PU based on the one or more motion vectors determined for the PU by motion estimation unit 42. Again, motion estimation unit 42 and motion compensation unit 44 may be functionally integrated in some examples. Upon receiving a motion vector for a PU of a current video block, motion compensation unit 44 may locate a predictive block from a picture of one of the reference picture lists based on the motion vector. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and may select the intra-prediction mode having the best rate-distortion characteristics among the tested intra-prediction modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 may form a residual video block by determining differences between prediction data (e.g., a predictive block) from mode select unit 40 and data from an original video block (e.g., a coding block) being coded. Summer 50 represents the component or components that perform this difference operation. Transform processing unit 52 may apply a transform to the residual block, producing a video block (i.e., a transform coefficient block) comprising residual transform coefficient values. For example, transform processing unit 52 may apply a discrete cosine transform (DCT) or a conceptually similar transform to produce the residual coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Video encoder 20 may encode various parameter sets in a coded video bitstream. Such parameter sets may include a picture parameter set (PPS), which may include syntax elements that are common to one or more pictures, a sequence parameter set, which may include syntax elements that are common to one or more sequences of pictures. Video encoder 20 may encode a flag in the PPS or the SPS that indicates whether inter-component color prediction is enabled for the pictures in the SPS or the PPS.

If video encoder signals a flag in an SPS or PPS that indicates inter-color component residual prediction is enabled, video encoder 20 may encode a flag in slice headers of each of the pictures in the SPS or PPS for which inter-component color prediction is enabled. The flag value encoded in the slice header may indicate whether inter-color component residual prediction is enabled for the CUs in the slice header. In some examples, there may be separate flags in the slice header, one for each chroma component. In some examples, there may be two separate flags in the slice header, one for each chroma component.

Video encoder 20 may also signal the scale factor value, alpha, used in inter-color component residual prediction in the slice header, SPS or the PPS. In some examples, video encoder 20 and video decoder 30 may agree upon, or may signal a table, which may be a map, in the SPS or the PPS. If video encoder 20 and video decoder 30 agree upon a table, video encoder 20 and video decoder 30 may build or be configured to store the table in the same way. A map may comprise a series of index values that correspond to respective alpha values. For example, if the encoder determines that a table of three different scale factor values should be used, e.g., $\{-2^N, 0, 2^N\}$, video encoder 20 may select and encode the following table of scale factor values:

TABLE 1

Sample Scale factor Table

| Alpha Index | Alpha Value |
|---|---|
| 0 | 0 |
| 1 | $2^N$ |
| 2 | $-2^N$ |

Video encoder 20 may select different tables having different table policies and scale factor distributions to improve the coding efficiency. To code the selected alpha of a table, video encoder 20 may signal an index value, which corresponds to a scale factor value instead of signaling the scale factor. For example, video encoder 20 may select and/or encode a table of scale factor alpha values in a uniform distribution, or a non-uniform distribution of values. In the non-uniform distributions, the scale factor values may be more concentrated around 0, and may be more sparsely distributed, as the scale factor values increase.

In some examples, video encoder 20 and video decoder 30 may adaptively select the distribution of scale factor alpha values in a pre-defined manner. In these examples, there may be an index value that corresponds to, and is assigned to a scale factor value. However, the scale factor values may vary depending on previously-determined or coded scale factor values of other blocks.

Video encoder 20 may also select a range of alpha values rather than selecting a map of alpha values. If video encoder 20 selects a range of scale factors rather than a map, video encoder 20 may select a uniform or non-uniform set of scale factor values within the range of scale factors. In some examples, video encoder 20 may select a scale factor from a range of [0, 7] so that video encoder 20 may directly encode the scale factor using a fixed length code. Selecting a range of [0,7] may enable video encoder 20 to signal a selected scale factor without coding a map between indices and scale factor values, which may improve the efficiency of the coded video bitstream. In some other examples, if video encoder 20 determines a non-uniform range of scale factors, video encoder 20 may utilize Exponential-Golomb code or Truncated-Rice coding of the scale factors. Video encoder 20 may also be configured to utilize code word truncation for the prefix and/or suffix using the known range.

In some examples, video encoder 20 and video decoder 30 may use a pre-defined, default table. In this case, video encoder 20 may not signal the map of signaling factors. Video encoder 20 may determine the default table based on the color space and/or chroma format of a slice, SPS, or PPS. For example, video encoder 20 and video decoder 30 may use a first table for a CU having a YCbCr format, and a second, different table for a CU having an RGB format. Additionally, video encoder 20 and video decoder 30 may determine the default table based on a chroma subsampling format, e.g. different tables for 4:4:4 and 4:2:2 chroma subsampling.

Video encoder 20 may support using a combination of pre-defined default tables, and explicitly-signaled tables. To indicate which table type (pre-defined vs. explicitly signaled) should be used for a particular PPS, SPS, slice, CU, etc., video encoder 20 may signal a flag value in the PPS, SPS, slice, CU, etc. Video encoder 20 may set the flag to zero if a default table is used, and to one if an explicitly-signaled map is used, or vice versa.

To reduce signaling overhead video encoder 20 may encode an "on/off" flag syntax element in each slice header. If video encoder 20 determines that all scale factor alpha values within a slice are equal to zero, video encoder 20 signals the flag value equal to zero. In this case, video encoder 20 may not signal additional bits within the slice body. Additionally video encoder 20 may signal residual chroma samples as normal, without using the equations described above (e.g., equation 1). If video encoder 20 determines that one or more scale factor values in a slice are non-zero, video encoder 20 may set the flag value equal to one.

Video encoder 20 may adaptively set the flag value that indicates whether one or more scale factors are nonzero, e.g., based on collected statistics from one or more previously encoded picture or slices. The statistics may be a number of previously-coded blocks, e.g., in a slice, picture, or set of pictures, having non-zero scale factors, for example. If the number of previously-coded blocks having non-zero scale factors is less than a pre-defined threshold, video encoder 20 may set the flag value to zero for the current slice. In this case, video encoder 20 may not determine a scale factor, and may not calculate predictive residual chroma samples according to the equations described above.

Following quantization, entropy encoding unit 56 entropy codes the quantized transform coefficients. In other words, entropy encoding unit 56 may entropy encode syntax elements representing the quantized transform coefficients. For example, entropy encoding unit 56 may perform context adaptive binary arithmetic coding (CABAC), context adaptive variable length coding (CAVLC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, video decoder 30 may transmit the encoded bitstream to another device (e.g., video decoder 30) or archived for later transmission or retrieval.

In addition to entropy coding quantized transform coefficients, entropy encoding unit 56 may be configured to entropy encode a scale factor. In various examples, entropy encoding unit 56 may be configured to signal the scale factor (alpha) value as a fixed-length code in bypass mode of a CABAC coder.

In some examples, entropy encoding unit 56 may entropy encode the scale factor using binarizations other than a fixed-length code in a bypass mode. Such other binarizations may include a Exponential-Golomb code or a Rice-Golomb code. In these examples, entropy encoding unit 56 may code a first part of the binarization (i.e. the unary or truncated unary part) using contexts in CABAC. Entropy encoding unit 56 may be configured to encode the second (fixed-length) part in bypass mode. Entropy encoding unit 56 may also be configured to signal the scale factor value as a truncated unary code. In these examples, the first bins of the code may be encoded using contexts in CABAC in order to improve performance. Entropy encoding unit 56 may be further configured to encode the remaining bins in bypass mode.

Motion compensation unit 72 and/or intra-prediction unit 74 may code an "on/off switch" for a coded residual chroma block as a flag syntax element. The block may be a CTU, CU, PU, or TU. If the flag syntax is in an "off" state, the flag value indicates that the scale factor is equal to zero for the block. If the flag value is equal to one, the flag value indicates that the scale factor for the block is non-zero, and that video encoder 20 has signaled the scale factor value. In some examples, mode select unit 40 may signal a sign value and a magnitude value of the scale factor separately.

Entropy encoding unit 56 may binarize the scale factor based on the distribution of scale factor values using CABAC. For example, entropy encoding unit 56 may binarize the scale factor using a fixed-length code. Entropy encoding unit 56 may signal the scale factor value at the same block level (CTU, CU, PU, or TU) as the on/off switch syntax element. In some examples, entropy encoding unit 56 may also signal the scale factor at a lower level of signaling. For example, entropy encoding unit 56 may signal the on/off switch syntax flag at the CU level, and if the flag is equal to one, entropy encoding unit 56 may signal the scale factor in each TU of the CU.

Inverse quantization unit 58 and inverse transform unit 60 apply inverse quantization and inverse transformation, respectively, to reconstruct the residual block in the pixel domain, e.g., for later use as a reference block. For instance, inverse quantization unit 58 may dequantize a transform coefficient block. Inverse transform unit 60 may reconstruct a transform block for a TU by applying an inverse transform to the dequantized transform coefficient block. Summer 62 adds the reconstructed residual block to the motion compensated prediction block produced by motion compensation unit 44 to produce a reconstructed video block for storage in reference picture memory 64. Motion estimation unit 42 and motion compensation unit 44 may use the reconstructed video block as a reference block to inter-code (i.e., inter predict) a block in a subsequent video frame. Motion compensation unit 44 may also apply one or more interpolation filters to the reconstructed residual block to calculate sub-integer pixel values for use in motion estimation.

Motion estimation unit 42 may determine one or more reference pictures, that video encoder 20 may use to predict the pixel values of one or more For PUs that are inter-predicted. Motion estimation unit 42 may signal each reference picture as an LTRP or a short-term reference picture. Motion estimation unit 42 may store the reference pictures in a decoded picture buffer (DPB) (e.g., reference picture memory 64) until the pictures are marked as unused for reference. Mode select unit 40 of video encoder 20 may encode various syntax elements that include identifying information for one or more reference pictures.

In this manner, video encoder 20 in FIG. 2 represents an example of a video encoder configured to determine luma residual samples for a block of video data, and determine predictive chroma residual samples for the block of video data. Video encoder 20 may be further configured to scale the luma residual samples with a scale factor to produce scaled luma residual samples, and determine updated chroma residual samples based on the predictive chroma residual samples and the scaled luma residual samples.

Figure 3:
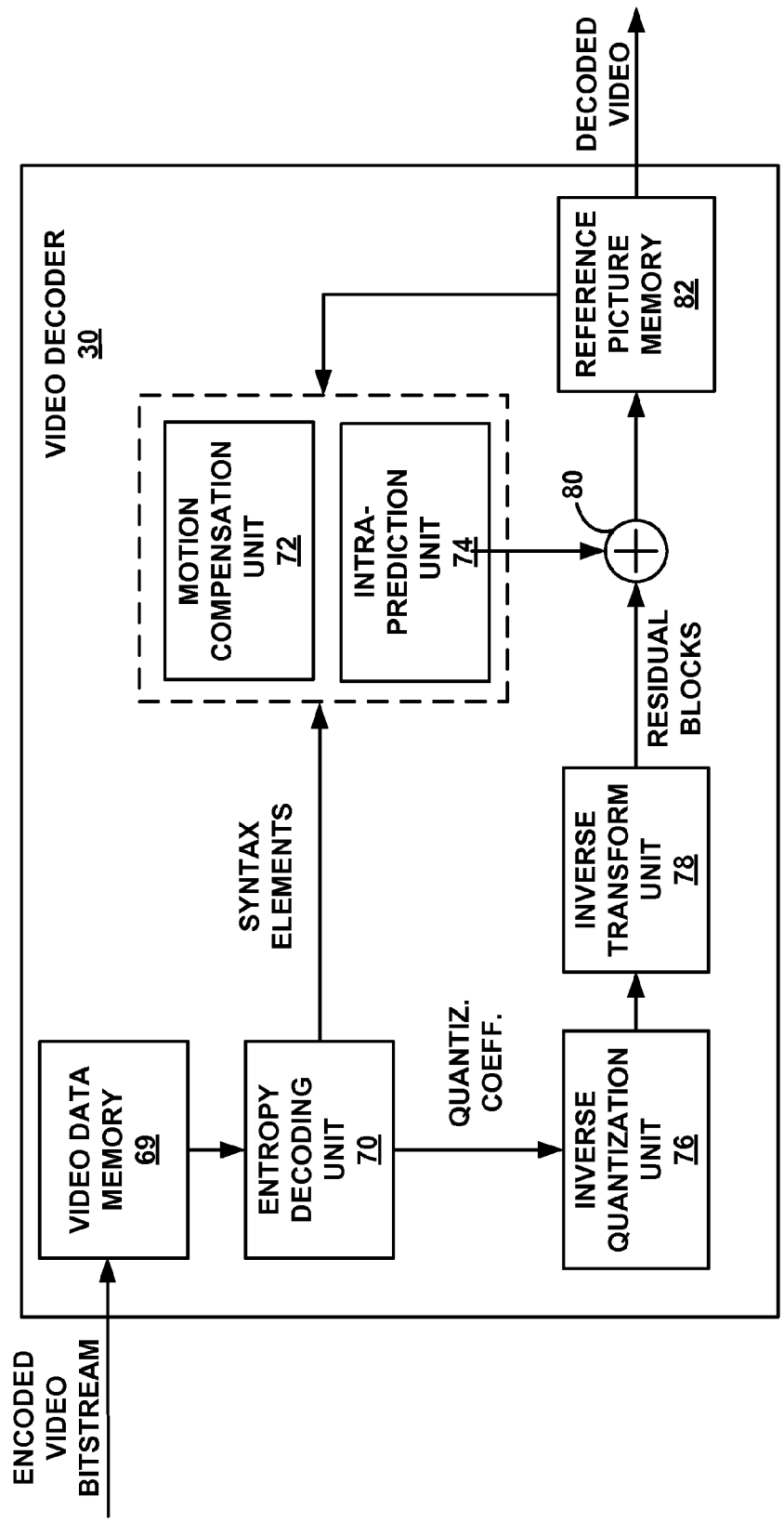
FIG. 3 is a block diagram illustrating an example of a video decoder that may perform techniques for inter-color component residual prediction in accordance with one or more aspects of this disclosure.

FIG. 3 is a block diagram illustrating an example of a video decoder that may perform techniques for inter-color component residual prediction in accordance with one or more aspects of this disclosure. In the example of FIG. 3, video decoder 30 includes a video data memory 69, an entropy decoding unit 70, motion compensation unit 72, intra-prediction unit 74, inverse quantization unit 76, inverse transformation unit 78, reference picture memory 82 and summer 80. In some examples, video decoder 30 may perform a decoding pass generally reciprocal to the encoding pass described with respect to video encoder 20 (FIG. 2).

Video data memory 69 may store video data, such as an encoded video bitstream, to be decoded by the components of video decoder 30. The video data stored in video data memory 69 may be obtained, for example, from computer-readable medium 16, e.g., from a local video source, such as a camera, via wired or wireless network communication of video data, or by accessing physical data storage media. Video data memory 69 may form a coded picture buffer (CPB) that stores encoded video data from an encoded video bitstream. Reference picture memory 82 may be a reference picture memory that stores reference video data for use in decoding video data by video decoder 30, e.g., in intra- or inter-coding modes. Video data memory 69 and reference picture memory 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and reference picture memory 82 may be provided by the same memory device or separate memory devices. In various examples, video data memory 69 may be on-chip with other components of video decoder 30, or off-chip relative to those components.

During the decoding process, video decoder 30 receives an encoded video bitstream that represents video blocks of an encoded video slice and associated syntax elements and/or syntax data from video encoder 20. Entropy decoding unit 70 of video decoder 30 entropy decodes the bitstream to generate quantized coefficients, motion vectors or intra-prediction mode indicators, and other syntax elements. Entropy decoding unit 70 may forward the motion vectors to and other syntax elements to motion compensation unit 72.

Entropy decoding unit 70 may receive syntax data for a CU, which may include one or more scale factor alpha values for use in inter-color component residual prediction as described in this disclosure. Video decoder 30 may be configured to decode encode a scale factor. In various examples, entropy decoding unit 70 may be configured to decoder the scale factor (alpha) value as a fixed-length code in bypass mode. In some examples, entropy decoding unit 70 may decode the scale factor using binarizations other than a fixed-length code in a bypass mode. Such other binarizations may include a Exponential-Golomb code or a Rice-Golomb code. In these examples, entropy decoding unit 70 may decode a first part of the binarization (i.e. the unary or truncated unary part) using contexts in CABAC. Entropy decoding unit 70 may be configured to entropy decode the second (fixed-length) part in bypass mode. Entropy decoding unit 70 may also be configured to entropy decode the scale factor value as a truncated unary code. In these examples, the first bins of the code may be decoded using contexts in CABAC in order to improve performance. Entropy decoding unit 70 may be further configured to decode the remaining bins in bypass mode.

In addition to receiving the scale factor alpha value, entropy decoding unit 70 may decode and parse additional syntax elements in various parameter sets. Such parameter sets may include a PPS, which may include syntax elements that are common to one or more pictures, an SPS, which may include syntax elements that are common to one or more sequences of pictures. Video decoder 30 may decode a flag from the PPS or the SPS that indicates whether inter-component color prediction is enabled for one or more blocks in the SPS or the PPS.

If entropy decoding unit 70 decodes a flag value that indicates inter-component color prediction is enabled, video decoder 30 may decode a flag in slice headers of each of the pictures in the SPS or PPS for which inter-color component residual prediction is enabled. The flag value decoded from the slice header may indicate whether inter-component prediction is enabled for the CUs in the slice. In some examples, there may be separate flags in the slice header, one for each chroma component. In some examples, there may be two separate flags in the slice header, one for each chroma component.

Entropy decoding unit 70 may also decode the scale factor value, alpha, from the SPS or the PPS. In some examples, video decoder 30 and video encoder 20 have agreed upon, or may receive a signaled a table from video encoder 20. The decoded table may be a map, of scale factor alpha values in the SPS or the PPS.

Entropy decoding unit 70 may decode different tables having different mapping rules. For example, video decoder 30 may select and/or decode a table of scale factor alpha values in a uniform distribution, or a non-uniform distribution of values. In the non-uniform distributions, the scale factor values may be more concentrated around 0, and may be more sparsely distributed, as the scale factor values increase.

In some examples, video decoder 30 may adaptively select the scale factor alpha values. In these examples, there may be an index value that corresponds to, and is assigned to a scale factor value. However, the scale factor values may vary depending on previously-determined or coded scale factor values.

Video decoder 30 may also receive, and entropy decoding unit 70 may decode a range of alpha values rather than receiving a map of alpha values. If video decoder 30 receives a range of scale factors rather than a map, video decoder 30 may utilize a uniform or non-uniform set of scale factor values within the range. In some examples, if the video decoder 30 utilizes a uniform set of scale factor values within the range, entropy decoding unit 70 may use a fixed length to entropy code for the scale factor values within the range. In some other examples, if video decoder 30 utilizes a non-uniform set of scale factor values within the range, entropy decoding unit 70 may use Exponential-Golomb or Truncated-Rice coding for the scale factors. Additionally, entropy decoding unit 70 may also truncate the prefix and/or suffix based on the specified range.

In some examples, video decoder 30 may use a pre-defined, default table. In this case, video decoder 30 may not receive the map of scale factors. Video decoder 30 may determine the default table based on the color space and/or chroma format of a slice, SPS, or PPS. For example video decoder 30 may use a first table for a CU having a YCbCr format, and a second, different table for a CU having an RGB format.

Video decoder 30 may use a combination of pre-defined default tables, and explicitly-signaled tables based on syntax data received in a coded video bitstream. To determine which table type (pre-defined vs. explicitly signaled) video decoder 30 should use for a particular PPS, SPS, slice, CU, block, etc., video decoder 30 may receive and parse a flag value in the PPS, SPS, slice, CU, etc. Video decoder 30 may use the default table if the flag value is equal to zero. Video decoder 30 may use an explicitly signaled map if the flag value is equal to one.

In some examples, entropy decoding unit 70 may further decode an "on/off" flag syntax element in each slice header. If entropy decoding unit 70 determines the flag value is equal to zero, then all scale factor alpha values within a slice are equal to zero. If video decoder 30 determines that the flag is equal to one, video decoder 30 may further determine that one or more scale factor values in a slice are non-zero, and may decode scale factor alpha values for blocks within the slice.

Entropy decoding unit 70 may decode the "on/off switch" from a CTU, CU, PU, or TU. If the flag syntax is in an "off" state, motion compensation unit 72 and/or intra-prediction unit 74 may determine that the flag value indicates that the scale factor is equal to zero for the block. If the flag value is equal to one, the flag value indicates that the scale factor for the block is non-zero, and that a scale factor value is present in the coded video bitstream. In some examples, motion compensation unit 72 and/or intra-prediction unit 74 may decode a sign value and a magnitude value of the scale factor separately.

Entropy decoding unit 70 may inversely binarize the scale factor based on the distribution of scale factor values using CABAC. For example, entropy decoding unit 70 may inversely binarize the scale factor using a fixed-length code. Entropy decoding unit 70 may decode the scale factor value at the same block level (CTU, CU, PU, or TU) as the on/off switch syntax element. In some examples, entropy decoding unit 70 may also decode the scale factor at a lower level of signaling. For example, entropy decoding unit 70 may decode code the on/off switch syntax flag at the CU level, and if the flag is equal to one, entropy decoding unit 70 may decode the scale factor in each TU of the CU.

Video decoder 30 may construct reference picture lists. List 0 and List 1, (e.g., using default construction techniques) based on reference pictures stored in reference picture memory 82. When the video slice is coded as an intra-coded (I) slice, intra-prediction unit 74 may generate prediction data for a video block of a current video slice. Intra-prediction unit 74 may generate the prediction data based on a signaled intra prediction mode and data from previously decoded blocks of the current frame or picture. When video decoder 30 codes slices of the video frame as an inter-coded (i.e., B, P or GPB) slice, motion compensation unit 72 may produce predictive blocks for a video block of the current video slice based on the motion vectors and other syntax elements received from entropy decoding unit 70. Motion compensation unit 72 may produce the predictive blocks from one of the reference pictures within one of the reference picture lists.

Motion compensation unit 72 may use motion vectors and/or syntax elements to predict determine prediction information for a video block of the current video slice. In some examples, motion compensation unit 72 may generate prediction information based on motion vectors received from entropy decoding unit 70. Motion compensation unit 72 may use the prediction information to produce the predictive blocks for the current video block being decoded. For example, motion compensation unit 72 uses some of the received syntax elements to determine a prediction mode (e.g., intra- or inter-prediction) used to code the video blocks of the current video slice, an inter-prediction slice type (e.g., B slice or P slice slice), construction information for one or more of the reference picture lists for the slice, motion vectors for each inter-encoded video block of the current video slice, inter-prediction status for each inter-coded video block of the slice, and other information to decode the video blocks in the current video slice.

When a motion vector of a PU has sub-pixel accuracy, motion compensation unit 72 may apply one or more interpolation filters to samples of a reference picture to generate a predictive block for the PU. In other words, motion compensation unit 72 may also perform interpolation based on interpolation filters. Motion compensation unit 72 may calculate interpolated values for sub-integer pixels of reference blocks using the same interpolation filters video encoder 20 used during encoding of the video blocks. Thus, in some examples, motion compensation unit 72 may determine the interpolation filters used by video encoder 20 from the received syntax elements and may use the interpolation filters to produce predictive blocks.

Inverse quantization unit 76 inverse quantizes. i.e., dequantizes, the quantized transform coefficients provided in the bitstream and decoded by entropy decoding unit 70. The inverse quantization process may include use of a quantization parameter $QP_Y$ to determine a degree of quantization and, likewise, a degree of inverse quantization that should be applied. Video decoder 30 may calculate the quantization parameter $QP_Y$ for each video block in the video slice.

Inverse transform unit 78 may receive dequantized transform coefficient blocks. If transform is skipped for the current block, inverse transform unit 78 may receive dequantized residual blocks. Inverse transform unit 78 may transform the received blocks using an inverse transform. In some examples, the inverse transform (e.g., an inverse DCT, an inverse integer transform, or a conceptually similar inverse transform process) to the transform coefficients in order to produce residual blocks (e.g., transform blocks) in the pixel domain. Inverse transform unit 78 may output a signal, referred to as a "reconstructed residual signal."

Video decoder 30 may also determine that the current block is intra-predicted based on syntax elements or other information. If the current video block is intra-predicted, intra-prediction unit 74 may decode the current block. Intra-prediction unit 74 may determine a neighboring predictive block from the same picture as the current block. Intra-prediction unit 74 may generate a transform coefficient block and/or a residual block based on the predictive block.

After motion compensation unit 72 or intra-prediction unit 74 generates a transform coefficient block and/or residual block for a current video block based on the motion vectors and other syntax elements, video decoder 30 forms a decoded video block by combining the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. Reference picture memory 82 stores the decoded video blocks in a given frame or picture, which video decoder 30 may use for subsequent motion compensation. Reference picture memory 82 may also store decoded video for later presentation on a display device, such as display device 32 of FIG. 1.

Motion compensation unit 72 and/or intra-prediction unit 74 may determine one or more scale factors for one or more blocks of a coding unit in accordance with the equations 1-9 described above. Motion compensation unit 72 and/or intra-prediction unit 74 may determine the block of chroma residual samples based on the a luma residual block, a scale factor, and predictive chroma residual samples. Motion compensation unit 72 and/or intra-prediction unit 74 may be configured to determine a scale factor based on syntax elements, as well.

Motion compensation unit 72 and/or intra-prediction unit 74 may be configured to determine the scale factor for one or more blocks based on a scale factor of a neighboring block. For example, motion compensation unit 72 and/or intra-prediction unit 74 may determine a scale factor predictor from a neighboring block relative to a current block. Motion compensation unit 72 and/or intra-prediction unit 74 may calculate the value for the current block as a sum of a scale factor difference value, and the scale factor predictor. The scale factor predictor may be a left-neighboring block. The scale factor predictor may also be an average of scale factors of a plurality of neighboring blocks relative to the current block.

Motion compensation unit 72 and/or intra-prediction unit 74 may be configured to derive a sign of the scale factor without video encoder 20 having explicitly signaled the sign of the scale factor in the coded video bitstream. For example, video encoder 20 may have signaled the signs of the residual blocks of luma samples in a coded video bitstreams. Motion compensation unit 72 and/or intra-prediction unit 74 may determine the sign of the scale factor from either of the signs of the residual blocks of luma samples. In another example, motion compensation unit 72 and/or intra-prediction unit 74 may only select the sign of the scale factor value as the opposite of either of the two signs of the residual luma sample blocks. In various examples, motion compensation unit 72 and/or intra-prediction unit 74 may be configured to restrict the sign of the scale factor to only one sign value (e.g., positive or zero).

Once video decoder 30 generates reconstructed video, video decoder 30 may output the reconstructed video blocks as decoded video (e.g., for display or storage) in some examples. In this manner, video decoder 30 represents an example of a video decoder configured to determine luma residual samples for a block of video data, and determine chroma residual samples for the block of video data. Video decoder 30 may be further configured to scale the luma residual samples with a scale factor to produce scaled luma residual samples, and updated chroma residual samples based on the predictive chroma residual samples and the scaled luma residual samples.

As described above, during inter-prediction, motion compensation unit 72 may determine one or more reference pictures that video decoder 30 may use to form the predictive video blocks for the current block being decoded. Motion compensation unit 72 may determine whether reference pictures are long term reference pictures or short-term reference pictures based on syntax elements of the coded video bitstream, which indicate whether a reference picture is marked for long term reference or short-term reference. Motion compensation unit 72 may store the reference pictures in a decoded picture buffer (DPB) (e.g., reference picture memory 82) until the reference pictures are marked as unused for reference.

Motion compensation unit 72 of video decoder 30 may decode various syntax elements that include identifying information for one or more reference pictures used to form predictive blocks for the currently decoding block. During the decoding of an inter-predicted PU, motion compensation unit 72 may decode identifying information of one or more LTRPs for the current picture which are signaled in the active sequence parameter set. Motion compensation unit 72 may also decode identifying information for one or more short-term reference pictures used for predicting the current picture in the slice header of the current picture or the picture parameter set for the current picture.

Figure 4:
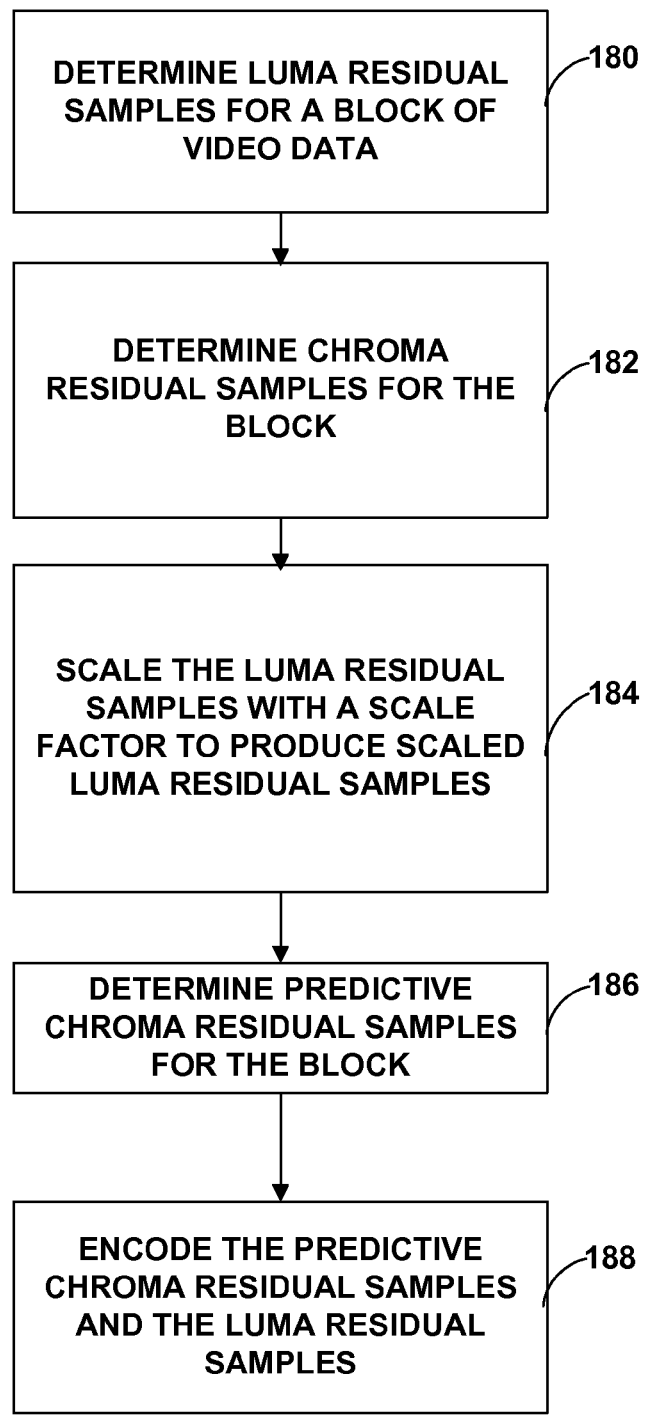
FIG. 4 is a flowchart illustrating an example of a process for performing inter-color component residual prediction in accordance with one or more aspects of this disclosure.

FIG. 4 is a flowchart illustrating an example of process for performing inter-color component residual prediction in accordance with one or more aspects of this disclosure. For purposes of illustration only, the method of FIG. 4 may be performed by a video encoder, such as a video encoder corresponding to video encoder 20 of FIGS. 1 and 2.

In the method of FIG. 4, motion compensation unit 44 of video encoder 20 may determine luma residual samples for a block of video data (180), and determine chroma residual samples for the block of video data (182). Transform processing unit 52 of video encoder 20 may be further configured to scale the luma residual samples with a scale factor to produce scaled luma residual samples (184), and determine predictive chroma residual samples for the block of video data based on the chroma residual samples and the scaled luma residual samples (186). Furthermore, entropy encoding unit 56 of video encoder 20 may encode the predictive chroma residual samples and the luma residual samples (188).

In some examples, quantization unit 52 may be further configured to: quantize the scaled luma residual samples to produce quantized and scaled luma samples. To determine the predictive chroma residual samples, transform processing unit 52 may subtract the quantized and scaled luma residual samples from the chroma residual samples to produce the predictive chroma residual samples. Entropy encoding unit 56 may be configured to encode information indicating the scale factor in an encoded video bitstream in some examples.

In some examples, if the block has a YCbCr 4:4:4 format, to determine the predictive chroma residual samples, motion compensation unit 44 may be further configured to determine:

$$R_{Cp}(x,y)=R_C(x,y)-(\alpha \cdot R_L(x,y))>>N$$

wherein $R_L$ is the residual luma samples, wherein $R_{Cp}$ is the predictive chroma residual samples, wherein $R_C$ is the updated residual chroma samples, wherein $\alpha$ is the scale factor, wherein N is a non-negative integer constant parameter.

In some examples, to determine the predictive chroma residual samples, motion compensation unit 44 may be configured to determine an offset value, and subtract the offset from the residual chroma samples. To determine the predictive residual chroma samples, motion compensation unit 44 may be further configured to determine:
$R_{Cp}(x,y)=R_C(x,y)-b-(\alpha \cdot R_L(x,y))>>N$, wherein $R_L$ is the residual luma samples, wherein $R_{Cp}$ is the predictive chroma residual samples, wherein $R_C$ is the updated residual chroma samples, wherein $\alpha$ is the scale factor, wherein b is the offset value, wherein N is a non-negative integer constant parameter, and wherein the block has a YCbCr 4:4:4 format.

Intra-prediction unit 46 may be configured to: responsive to determining that residual chroma samples of the video block and residual samples of the video block have a same intra prediction direction, determine the predictive residual chroma samples, in some examples.

In various examples, to determine predictive residual chroma samples, motion compensation unit 44 may be configured to determine:

$$R_{Cp}(x,y)=R_C(x,y)-(\alpha \cdot R_L(x<<1,y))>>N$$

wherein $R_L$ is the residual luma samples, wherein $R_{Cp}$ is the predictive chroma residual samples, wherein $R_C$ is the updated residual chroma samples, wherein $\alpha$ is the scale factor, wherein N is a non-negative integer constant parameter, and wherein the block has a YCbCr 4:2:2 chroma subsampling.

In various examples, to determine predictive residual chroma samples, motion compensation unit 44 may be configured to determine:

$$R_{Cp}(x,y)=R_C(x,y)-(\alpha \cdot ((R_L(2x,y))+R_L(2x+1,y))/2))>>N$$

wherein $R_L$ is the residual luma samples, wherein $R_{Cp}$ is the predictive chroma residual samples, wherein $R_C$ is the updated residual chroma samples, wherein $\alpha$ is the scale factor, wherein N is a non-negative integer constant parameter, and wherein the block has a YCbCr 4:2:2 chroma subsampling.

In some examples, motion estimation unit 42 may be configured to determine the scale factor. To determine the scale factor, motion estimation unit 42 may be configured to signal a sign for the scale factor in a first syntax element, and signal a magnitude of the scale factor in a second syntax element.

In some examples, to determine the scale factor, motion estimation unit 42 may be configured to signal, in a slice header, a syntax element that indicates whether the scale factor is equal to zero. Responsive to signaling that the scale factor is not equal to zero, entropy encoding unit 56 may signal a syntax element that indicates whether the scale factor is equal to zero in at least one of a group consisting of: a coding tree unit (CTU), coding unit (CU), prediction unit (PU), and a transform unit (TU) of the predictive block of residual chroma samples.

In accordance with the techniques of this disclosure and in accordance with the method of FIG. 4 will now be described. Video encoder 20 may perform the following examples.

In some examples, determining the scale factor may comprise: selecting the scale factor from one of a group consisting of: a default scale factor mapping table that is not signaled, and a signaled scale factor mapping table.

In some examples, the signaled scale factor mapping table is signaled in at least one of a group consisting of a picture parameter set (PPS) and a sequence parameter set (SPS) of a coded video bitstream.

In some examples, the default scale factor mapping table may be defined according to at least one of a group consisting of: a color space associated with the CU and a chroma format of the CU.

In some examples, the default scale factor mapping table comprises a plurality of default scale factor mapping tables, and wherein selecting the scale factor comprises selecting the scale factor from the signaled scale factor mapping table or one of the plurality of default scale factor mapping tables.

In some examples, at least one of the default scale factor mapping table and the signaled mapping table conform to a uniform distribution of scale factors.

In some examples, at least one of the default scale factor mapping table and the signaled scale factor mapping table conform to a non-uniform distribution of scale factors.

In some examples, the method of FIG. 4 may further comprise: adaptively determining a distribution of scale factors for the signaled scale factor mapping table based on previously determined scale factors.

In some examples, the method of FIG. 4 determining the scale factor further may comprise: determining a sign of the scale factor based on signs of the samples of the residual block of chroma samples and the signs of the samples of the residual luma block.

In some examples, the method of FIG. 4 may further comprise: entropy encoding the scale factor.

In some examples, entropy encoding the scale factor may comprise entropy encoding the scale factor using a fixed length context-adaptive binary arithmetic coding (CABAC) code in bypass mode.

In some examples, wherein the scale factor may be binarized according to at least one of a group consisting of: an Exponential-Golomb code and a Rice-Golomb code, wherein entropy encoding the scale factor comprises: CABAC encoding a unary part of the binarization of the scale factor using a CABAC context; and CABAC encoding a fixed length part of the scale factor using a CABAC bypass mode.

In some examples, the scale factor is coded using a truncated unary code, wherein entropy encoding the scale factor comprises: CABAC encoding at least one first bin of the truncated unary code using a CABAC context; and entropy encoding at least one remaining bin of the truncated unary code using a CABAC bypass mode.

In some examples, determining the scale factor may further comprise: signaling, in a slice header, a syntax element that indicates whether the scale factor is equal to zero; and responsive to signaling that the scale factor is not equal to zero: signaling a syntax element that indicates whether the scale factor is equal to zero in at least one of a group consisting of: a coding tree unit (CTU), coding unit (CU), prediction unit (PU), and a transform unit (TU) of the predictive block of residual chroma samples.

In some examples, the scale factor may be signaled in the at least one of the CTU, CU, PU, and TU of the syntax element that indicates whether the scale factor is equal to zero. In some examples, the scale factor may be signaled in a different at least one of the CTU, CU, PU, and TU of the syntax element that indicates whether the scale factor is equal to zero.

In some examples, determining the scale factor further comprises: signaling a sign of the scale factor based on a sum of the samples of the residual chroma block and a sum of the samples of the residual luma block.

In some examples, the method of FIG. 4 may further comprise: signaling that the sign of the scale factor is equal to zero if a sign of the sum of the samples of the predictive residual chroma block and a sign of the sum of the samples of the residual luma samples block are different.

In some examples, the method of FIG. 4 may further comprise: if the sign of the sum of the samples of the predictive residual chroma block and the sign of the sum of the samples of the residual luma block have a same sign, signaling that the sign of the scale factor is equal to the sign of the sum of the samples of the predictive residual chroma block and the sign of the samples of the residual luma block.

In some examples, the method of FIG. 4 may further comprise: if a sign of the sum of the samples of the predictive residual chroma block and a sign of the sum of the samples of the residual luma block have a same sign, signaling that the sign of the scale factor is different than the sign of the sum of the samples of the residual chroma block and the sign of the samples of the residual luma block.

In some examples, determining the scale factor may further comprises: signaling a sign of the scale factor, wherein the sign of the scale factor is restricted to having only one of: a positive sign value and a negative sign value.

In some examples, determining the updated block of residual chroma samples further comprises signaling the predictive block of residual chroma samples responsive to determining that the predictive block of residual chroma samples has at least a minimum size.

In some examples, determining the scale factor comprises: calculating a residual scale factor for the predictive block of residual chroma samples as a difference of the scale factor and the scale factor predictor; and signaling a scale factor predictor residual value based on at least one neighboring block relative to the predictive residual chroma block.

In some examples, determining the scale factor predictor may comprise signaling the scale factor predictor as a difference between the scale factor and an average of a plurality of scale factors of neighboring blocks relative to the predictive block of residual chroma samples.

In some examples, video encoder 20 may determine the scale factor predictor may as a difference of the scale factor and a scale factor of a left-neighboring block relative to the predictive block of residual chroma samples.

In some examples, if the block has a YCbCr 4:2:2 chroma subsampling format, wherein the residual block of chroma samples comprises a first predictive residual chroma block, wherein the residual block of luma samples corresponds to the first predictive residual chroma block and a second predictive residual chroma block, wherein the residual block of luma samples has a resolution of X×Y samples, wherein the first and second predictive residual chroma blocks have a resolution of (X/2)×(Y/2) samples, wherein determining the scale factor comprises: downsampling the residual block of luma samples block to produce a downsampled luma block having have a resolution of (X/2); and determining a first scale factor for the first predictive residual chroma block based on the downsampled residual luma block, the method further comprising: determining a second scale factor predictor for the second predictive residual chroma block based on: the first scale factor, the first predictive residual chroma block, the second predictive residual chroma block, and the downsampled residual luma block.

In some examples, determining the second scale factor may comprises:

$$\alpha_1 = \alpha_0 - \frac{\Sigma(P_1[C_1(x, y)] - P_0[C_1(x, y)])L(x, y)}{\Sigma L^2(x, y)}$$

wherein $\alpha_0$ is the first scale factor, wherein $\alpha_1$ is the second scale factor, wherein $P_0[C_1(x,y)]$ is the first predictive residual chroma block, wherein $P_1[C_1(x,y)]$ is the second predictive residual chroma block, and wherein L(x, y) corresponds to the residual luma block.

Figure 5:
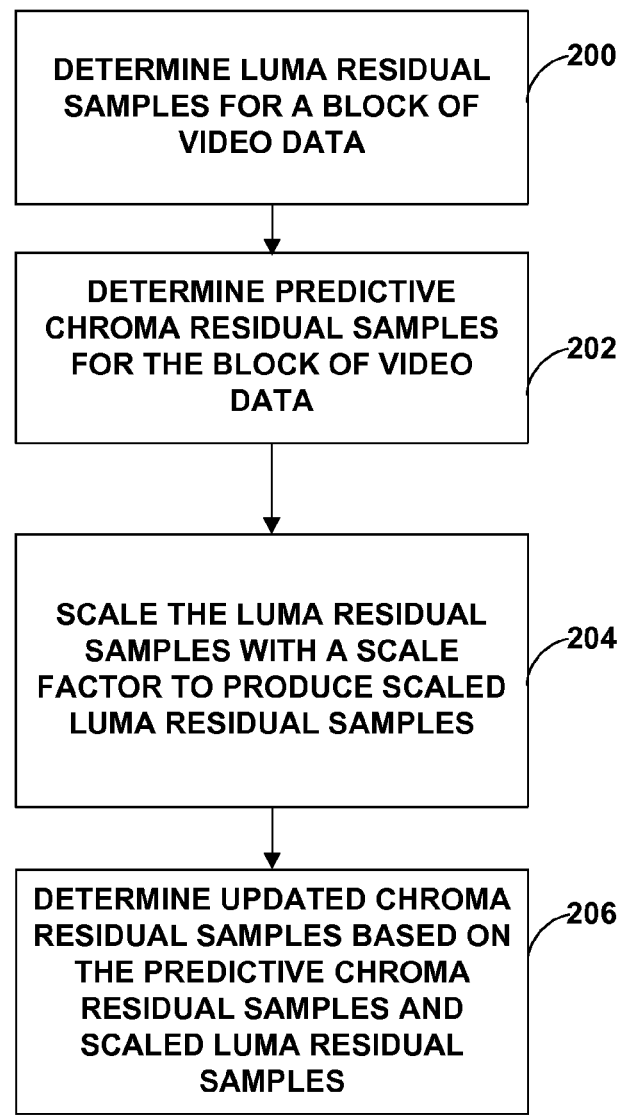
FIG. 5 is a flowchart illustrating another example of a process for performing inter-color component residual prediction in accordance with one or more aspects of this disclosure.

FIG. 5 is a flowchart illustrating an example of a process for transforming video data having an RGB color space to video data having a second color space using a color transform in accordance with one or more aspects of this disclosure. For purposes of illustration only, the method of FIG. 5 may be performed by a video encoder, such as a video encoder corresponding to video decoder 30 of FIGS. 1 and 2.

In the method of FIG. 5, video decoder 30 may determine luma residual samples for a block of video data (200), and determine predictive chroma residual samples for the block of video data (202). Video decoder 30 may be further configured to scale the luma residual samples with a scale factor to produce scaled luma residual samples (204). Furthermore, video decoder 30 may determine updated chroma residual samples based on the predictive chroma residual samples and the scaled luma residual samples (206).

To determine the updated block of residual chroma samples, motion compensation unit 44 may be further configured to determine a scale factor for the residual block of luma samples. Motion compensation unit 44 may further multiply the residual block of luma samples by the scale factor to produce a scaled block of residual luma samples, quantize the scaled block of residual luma samples to produce a of quantized block of residual luma samples, and add the quantized block of residual luma samples with the predictive block of residual chroma samples to produce the updated block of residual chroma samples.

In some examples, entropy decoding unit 70 may be further configured to quantize the scaled luma residual samples to produce quantized and scaled luma residual samples. To determine the updated chroma residual samples, the at least one processor is further configured to adding the quantized and scaled luma residual samples with the predictive chroma residual samples to produce the updated chroma residual samples. In some examples, entropy decoding unit 70 may be further configured to receive a scale factor in an encoded video bitstream.

In some examples, to determine the updated chroma residual samples, motion compensation unit 72 may be configured to determine: to determine the updated chroma residual samples, the at least one processor is configured to determine:

$$R_C(x,y)=R_{Cp}(x,y)+(\alpha \cdot R_L(x,y))>>N$$

wherein $R_L$ is the residual luma samples,
wherein $R_{Cp}$ is the predictive chroma residual samples,
wherein $R_C$ is the updated residual chroma samples.
wherein $\alpha$ is the scale factor,
wherein N is a non-negative integer constant parameter, and
wherein the block has a YCbCr 4:4:4 format.

In some examples, to determine the updated chroma residual samples, motion compensation unit 72 may be configured to determine:

$$R_C(x,y)=R_{Cp}(x,y)+(\alpha \cdot R_L(x,y))>>N$$

wherein $R_L$ is the residual luma samples, wherein $R_{Cp}$ is the predictive chroma residual samples, wherein $R_C$ is the updated residual chroma samples, wherein $\alpha$ is the scale factor, wherein N is a non-negative integer constant parameter, and wherein the block has a YCbCr 4:4:4 format.

In some examples, to determine the updated chroma residual samples, motion compensation unit 72 may be configured to determine:
$R_C(x,y)=R_{Cp}(x,y)+(\alpha \cdot R_L(x,y))>>N$, wherein $R_L$ is the residual luma samples, wherein $R_{Cp}$ is the predictive chroma residual samples, wherein $R_C$ is the updated residual chroma samples, wherein $\alpha$ is the scale factor, wherein N is a non-negative integer constant parameter, and wherein the block has a YCbCr 4:4:4 format.

In some examples, to determine the updated chroma residual samples, motion compensation unit 72 may be configured to determine an offset value, and add the offset to the quantized luma residual samples. To determine the updated residual chroma samples, motion compensation unit 72 may be further configured to determine: $R_C(x,y)=R_{Cp}(x,y)+b+(\alpha \cdot R_L(x,y))>>N$, wherein $R_L$ is the residual luma samples, wherein $R_{Cp}$ is the predictive chroma residual samples, wherein $R_C$ is the updated residual chroma samples, wherein $\alpha$ is the scale factor, wherein b is the offset value, wherein N is a non-negative integer constant parameter, and wherein the block has a YCbCr 4:4:4 format.

In some examples, to determine the updated chroma residual samples, responsive to intra-prediction unit 74 determining that residual chroma samples of the video block and residual samples of the video block have a same intra prediction direction, motion compensation unit 72 may determine the predictive residual chroma samples.

In some examples, to determine the updated chroma residual samples, motion compensation unit 72 may be configured to determine:
$R_C(x,y)=R_{Cp}(x,y)+(\alpha \cdot R_L(x<<1,y))>>N$, wherein $R_L$ is the residual luma samples, wherein $R_{Cp}$ is the predictive chroma residual samples, wherein $R_C$ is the updated residual chroma samples, wherein $\alpha$ is the scale factor, wherein N is a non-negative integer constant parameter, and if the block has a YCbCr 4:2:2 chroma subsampling.

In some examples, to determine the updated chroma residual samples, motion compensation unit 72 may be configured to determine:

$$R_C(x,y)=R_{Cp}(x,y)+(\alpha \cdot ((R_L(2x,y))+R_L(2x+1,y))/2))>>N,$$

wherein $R_L$ is the residual luma samples, wherein $R_{Cp}$ is the predictive chroma residual samples, wherein $R_C$ is the updated residual chroma samples, wherein $\alpha$ is the scale factor, wherein N is a non-negative integer constant parameter, if the block has a YCbCr 4:2:2 chroma subsampling.

In some examples, to determine the scale factor, entropy decoding unit 70 may be configured to determine whether the scale factor is equal to zero based on a value coded in a slice header that includes the block. Entropy decoding unit 70 may be further configured to: responsive to determining that the value in the slice header is equal to one, determine whether the scale factor is equal to zero based on a value of a syntax element coded in at least one of a group consisting of a coding tree unit (CTU), a coding unit (CU), a prediction unit (PU), and a transform unit (TU) associated with the predictive chroma residual samples.

In some examples, to determine the scale factor, entropy decoding unit 70 may be configured to determine a sign for the scale factor from a first syntax element, and determine a magnitude of the scale factor from a second syntax element.

Video decoder 30 may add a corresponding block of residual samples with predictive samples of the block to reconstruct the actual samples of the block. Video decoder 30 may combine blocks of chroma and luma residual samples with predictive samples to form final pixels for the block.

Various examples in accordance with the techniques of this disclosure will now be described. In one example, wherein determining the scale factor comprises: selecting the scale factor from a plurality of scale factors in one of a group consisting of a default scale factor table that is not signaled in a coded video bitstream and a scale factor table that is signaled in the coded bitstream.

In some examples, the signaled scale factor table is signaled in at least one of a group consisting of: a picture parameter set (PPS) and a sequence parameter set (SPS) of the coded video bitstream.

In some examples, the default scale factor table is defined according to at least one of a group consisting of: a color space associated with the block of video data and a chroma format of the block of video data.

In some examples, the default scale factor table comprises a plurality of default scale factor tables.

In some examples, least one of the group consisting of the default scale factor table or the signaled scale factor table include to a uniform distribution of scale factors.

In some examples, the at least one of the default scale factor table and the signaled scale factor table conform to a non-uniform distribution of scale factors.

In some examples, determining the scale factor further comprises: determining a sign of the scale factor based on signs of the samples of the predictive block of residual chroma samples and the signs of the samples of the residual luma block.

In some examples, the method of FIG. 5 further comprises comprising entropy decoding the scale factor using a fixed length code in a bypass mode of a context-adaptive binary arithmetic coding (CABAC) unit.

In some examples, the method of FIG. 5 may further comprise entropy decoding the scale factor, wherein the scale factor is binarized according to at least one of a group consisting of an Exponential-Golomb code and a Rice-Golomb code, and wherein entropy decoding the scale factor comprises: CABAC decoding a unary part of the binarization of the scale factor using a CABAC context, and CABAC decoding a fixed length part of the scale factor using a CABAC bypass mode.

In some examples, the method of FIG. 5 may further comprise entropy decoding the scale factor, wherein the scale factor is coded using a truncated unary code, and wherein entropy decoding the scale factor comprises: CABAC decoding at least one first bin of the truncated unary code using a CABAC context, and entropy decoding at least one remaining bin of the truncated unary code using a CABAC bypass mode.

In some examples, the method of FIG. 5 may further comprise signaling the scale factor in the at least one of the CTU, CU, PU, and TU of the syntax element that indicates whether the scale factor is equal to zero.

In some examples, the method of FIG. 5 may further comprise signaling the scale factor in a different at least one of the CTU, CU, PU, and TU of the syntax element that indicates whether the scale factor is equal to zero.

In some examples, in the method of FIG. 5, determining the scale factor further may comprise: determining a sign of the scale factor based on a sum of the samples of the residual chroma block and a sum of the samples of the residual luma block.

In some examples, the method of FIG. 5 may further comprise determining the sign of the scale factor is equal to zero if a sign of the sum of the samples of the predictive residual chroma block and a sign of the sum of the samples of the residual luma samples block are different.

In some examples, the method of FIG. 5 may further comprise: if the sign of the sum of the samples of the predictive residual chroma block and the sign of the sum of the samples of the residual luma block have a same sign, determining that the sign of the scale factor is equal to the sign of the sum of the samples of the predictive residual chroma block and the sign of the samples of the residual luma block.

In some examples, the method of FIG. 5 may further comprise: if a sign of the sum of the samples of the predictive residual chroma block and a sign of the sum of the samples of the residual luma block have a same sign, determining that the sign of the scale factor is different than the sign of the sum of the samples of the residual chroma block and the sign of the samples of the residual luma block.

In some examples, in the method of FIG. 5, determining the scale factor may further comprise: determining a sign of the scale factor, wherein the sign of the scale factor is restricted to having only one of: a positive sign value and a negative sign value.

In some examples, the method of FIG. 5 may further comprise determining the updated block of residual chroma samples further comprises determining the updated block of residual chroma samples responsive to determining that the predictive block of residual chroma samples has at least a minimum size.

In some examples, the method of FIG. 5, determining the scale factor may further comprise: determining a scale factor predictor from at least one neighboring block relative to the predictive residual chroma block; determining a residual scale factor for the predictive block of residual chroma samples; and calculating the scale factor for the predictive block of residual chroma samples as the sum of the scale factor predictor and the residual scale factor.

In some examples, in the method of FIG. 5 determining the scale factor predictor may comprise determining the scale factor predictor as an average of a plurality of scale factors of neighboring blocks relative to the predictive block of residual chroma samples.

In some examples, in the method of FIG. 5, the scale factor predictor is a scale factor of a left-neighboring block relative to the predictive block of residual chroma samples.

In some examples, herein the CU has a YCbCr 4:2:2 chroma subsampling format, wherein the residual chroma samples comprises a first predictive residual chroma block, wherein the residual luma samples corresponds to the first predictive residual chroma block and a second predictive residual chroma block, wherein the residual luma samples have a resolution of X×Y samples, wherein the first and second predictive residual chroma blocks have a resolution of (X/2)×(Y/2) samples, wherein determining the scale factor comprises: downsampling the residual block luma samples to produce a downsampled residual luma block having have a resolution of (X/2); and determining a first scale factor for the first predictive residual chroma block based on the downsampled residual luma block, the method further comprising: determining a second scale factor for the second predictive residual chroma block based on: the first scale factor, the first predictive residual chroma block, the second predictive residual chroma block, and the downsampled residual luma block.

In some examples, in the method of FIG. 5, determining the second scale factor may comprise determining the second scale factor according to the following equation:

$$\alpha_1 = \alpha_0 - \frac{\Sigma(P_1[C_1(x, y)] - P_0[C_1(x, y)])L(x, y)}{\Sigma L^2(x, y)}$$

wherein $\alpha_0$ is the first scale factor, wherein $\alpha_1$ is the second scale factor, wherein $P_0[C_1(x,y)]$ is the first predictive residual chroma block, wherein $P_1[C_1(x,y)]$ is the second predictive residual chroma block, and wherein L(x, y) corresponds to the residual luma block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any con is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining luma residual samples for a block of video data;
    determining predictive chroma residual samples for the block of video data;
    scaling the luma residual samples with a scale factor to produce scaled luma residual samples; and
    determining updated chroma residual samples based on the predictive chroma residual samples and the scaled luma residual samples,
    wherein determining the updated chroma residual samples comprises determining:

$R_C(x,y) = R_{Cp}(x,y) + (\alpha \cdot R_L(x,y)) \gg N,$ wherein $R_L$ is the residual luma samples,
    wherein $R_{Cp}$ is the predictive chroma residual samples,
    wherein $R_C$ is the updated residual chroma samples,
    wherein $\alpha$ is the scale factor,
    wherein N is a non-negative integer constant parameter, and
    wherein the block has a YCbCr 4:4:4 format.

2. The method of claim 1, further comprising:
    quantizing the scaled luma residual samples to produce quantized and scaled luma residual samples, wherein determining the updated chroma residual samples comprises adding the quantized and scaled luma residual samples with the predictive chroma residual samples to produce the updated chroma residual samples.

3. The method of claim 1, further comprising receiving the scale factor in an encoded video bitstream.

4. The method of claim 1, wherein determining the updated chroma residual samples further comprises:
determining an offset value; and
adding the offset to the quantized luma residual samples.

5. The method of claim 4, wherein determining the updated residual samples comprises determining:

$$R_C(x,y)=R_{Cp}(x,y)+b+(\alpha \cdot R_L(x,y))>>N,$$

wherein b is the offset value.

6. The method of claim 1, wherein determining the predictive residual chroma samples comprises:
responsive to determining that chroma samples of the video block and luma samples of the video block have a same intra prediction direction, determining the updated residual chroma samples.

7. The method of claim 1, wherein determining the scale factor further comprises:
determining a sign for the scale factor from a first syntax element; and
determining a magnitude of the scale factor from a second syntax element.

8. The method of claim 1, wherein determining the scale factor further comprises determining whether the scale factor is equal to zero based on a value coded in a slice header that includes the block, the method further comprising:
responsive to determining that the value in the slice header is equal to one, determining whether the scale factor is equal to zero based on a value of a syntax element coded in at least one of a group consisting of a coding tree unit (CTU), a coding unit (CU), a prediction unit (PU), and a transform unit (TU) associated with the predictive chroma residual samples.

9. A method of encoding video, the method comprising:
determining luma residual samples for a block of video data;
determining chroma residual samples for the block of video data;
scaling the luma residual samples with a scale factor to produce scaled luma residual samples;
determining predictive chroma residual samples for the block of video data based on the chroma residual samples and the scaled luma residual samples; and
encoding the predictive chroma residual samples and the luma residual samples,
wherein determining the predictive chroma residual samples comprises determining:

$$R_{Cp}(x,y)=R_C(x,y)-(\alpha \cdot R_L(x,y))>>N,$$

wherein $R_L$ is the residual luma samples,
wherein $R_{Cp}$ is the predictive chroma residual samples,
wherein $R_C$ is the updated residual chroma samples,
wherein $\alpha$ is the scale factor,
wherein N is a non-negative integer constant parameter, and
wherein the block has a YCbCr 4:4:4 format.

10. The method of claim 9, further comprising: quantizing the scaled luma residual samples to produce quantized and scaled luma samples, wherein determining the predictive chroma residual samples comprises subtracting the quantized and scaled luma residual samples from the chroma residual samples to produce the predictive chroma residual samples.

11. The method of claim 9, further comprising encoding information indicating the scale factor in an encoded video bitstream.

12. The method of claim 9, wherein determining the predictive chroma residual samples further comprises:
determining an offset value; and
subtracting the offset from the residual chroma samples.

13. The method of claim 12, wherein determining the predictive residual chroma samples comprises determining:

$$R_{Cp}(x,y)=R_C(x,y)-b-(\alpha \cdot R_L(x,y))>>N,$$

wherein b is the offset value.

14. The method of claim 9, wherein determining the predictive residual chroma samples comprises:
responsive to determining that residual chroma samples of the video block and residual samples of the video block have a same intra prediction direction, determining the predictive residual chroma samples.

15. The method of claim 9, wherein determining the scale factor further comprises: signaling a sign for the scale factor in a first syntax element; and
signaling a magnitude of the scale factor in a second syntax element.

16. The method of claim 9, wherein determining the scale factor further comprises:
signaling, in a slice header, a syntax element that indicates whether the scale factor is equal to zero; and
responsive to signaling that the scale factor is not equal to zero:
signaling a syntax element that indicates whether the scale factor is equal to zero in at least one of a group consisting of: a coding tree unit (CTU), coding unit (CU), prediction unit (PU), and a transform unit (TU) of the predictive block of residual chroma samples.

17. A device for decoding video data, the device comprising:
a memory configured to store video data; and
at least one processor configured to:
determine luma residual samples for a block of video data;
determine predictive chroma residual samples for the block of video data;
scale the luma residual samples with a scale factor to produce scaled luma residual samples; and
determine updated chroma residual samples based on the predictive chroma residual samples and the scaled luma residual samples,
wherein to determine the updated chroma residual samples, the at least one processor is configured to determine:

$$R_C(x,y)=R_{Cp}(x,y)+(\alpha \cdot R_L(x,y))>>N,$$

wherein $R_L$ is the residual luma samples,
wherein $R_{Cp}$ is the predictive chroma residual samples,
wherein $R_C$ is the updated residual chroma samples,
wherein $\alpha$ is the scale factor,
wherein N is a non-negative integer constant parameter, and
wherein the block has a YCbCr 4:4:4 format.

18. The device of claim 17, wherein the at least one processor is further configured to:
quantize the scaled luma residual samples to produce quantized and scaled luma residual samples, wherein to determine the updated chroma residual samples, the at least one processor is further configured to add the quantized and scaled luma residual samples with the predictive chroma residual samples to produce the updated chroma residual samples.

19. The device of claim 17, wherein the at least one processor is further configured to receive the scale factor in an encoded video bitstream.

20. The device of claim 17, wherein to determine the updated chroma residual samples, the at least one processor is further configured to:
determine an offset value; and
add the offset to the quantized luma residual samples.

21. The device of claim 20, wherein to determine the updated residual chroma samples, the at least one processor is configured to determine:

$$R_C(x,y)=R_{Cp}(x,y)+b+(\alpha \cdot R_L(x,y))>>N,$$

wherein b is the offset value.

22. The device of claim 17, wherein to determine the predictive residual chroma samples, the at least one processor is further configured to:
responsive to determining that residual chroma samples of the video block and residual samples of the video block have a same intra prediction direction, determine the predictive residual chroma samples.

23. The device of claim 17, wherein to determine the scale factor, the at least one processor is further configured to:
determine a sign for the scale factor from a first syntax element; and
determine a magnitude of the scale factor from a second syntax element.

24. The device of claim 17, wherein to determine the scale factor, the at least one processor is further configured to determine whether the scale factor is equal to zero based on a value coded in a slice header that includes the block, wherein the at least one processor is further configured to:
responsive to determining that the value in the slice header is equal to one, determine whether the scale factor is equal to zero based on a value of a syntax element coded in at least one of a group consisting of a coding tree unit (CTU), a coding unit (CU), a prediction unit (PU), and a transform unit (TU) associated with the predictive chroma residual samples.

25. A device for encoding video, the device comprising:
a memory configured to store video data; and
at least one processor configured to:
determine luma residual samples for a block of video data;
determine chroma residual samples for the block of video data;
scale the luma residual samples with a scale factor to produce scaled luma residual samples;
determine predictive chroma residual samples for the block of video data based on the chroma residual samples and the scaled luma residual samples; and
encode the predictive chroma residual samples and the luma residual samples,
wherein to determine the predictive chroma residual samples the at least one processor is further configured to determine:

$$R_{Cp}(x,y)=R_C(x,y)-(\alpha \cdot R_L(x,y))>>N,$$

wherein $R_L$ is the residual luma samples,
wherein $R_{Cp}$ is the predictive chroma residual samples,
wherein $R_C$ is the updated residual chroma samples,
wherein $\alpha$ is the scale factor, wherein N is a non-negative integer constant parameter, and
wherein the block has a YCbCr 4:4:4 format.

26. The device of claim 25, wherein the at least one processor is further configured to: quantize the scaled luma residual samples to produce quantized and scaled luma samples, wherein to determine the predictive chroma residual samples, the at least one processor is further configured to subtract the quantized and scaled luma residual samples from the chroma residual samples to produce the predictive chroma residual samples.

27. The device of claim 25, wherein the at least one processor is further configured to: encode information indicating the scale factor in an encoded video bitstream.

28. The device of claim 25, wherein to determine the predictive chroma residual samples, the at least one processor is further configured to:
determine an offset value; and
subtract the offset from the residual chroma samples.

29. The device of claim 28, wherein to determine the predictive residual chroma samples, the at least one processor is further configured to determine:

$$R_{Cp}(x,y)=R_C(x,y)-b-(\alpha \cdot R_L(x,y))>>N,$$

wherein b is the offset value.

30. The device of claim 25, wherein to determine the predictive chroma residual samples, the at least one processor is further configured to:
responsive to determining that residual chroma samples of the video block and residual samples of the video block have a same intra prediction direction, determine the predictive residual chroma samples.

31. The device of claim 25, wherein to determine the scale factor, the at least one processor is further configured to:
signal a sign for the scale factor in a first syntax element; and
signal a magnitude of the scale factor in a second syntax element.

32. The device of claim 25, wherein to determine the scale factor, the at least one processor is further configured to:
signal, in a slice header, a syntax element that indicates whether the scale factor is equal to zero; and
responsive to signaling that the scale factor is not equal to zero:
signal a syntax element that indicates whether the scale factor is equal to zero in at least one of a group consisting of: a coding tree unit (CTU), coding unit (CU), prediction unit (PU), and a transform unit (TU) of the predictive block of residual chroma samples.

33. A device for decoding video, the device comprising:
means for determining luma residual samples for a block of video data;
means for determining predictive chroma residual samples for the block of video data;
means for scaling the luma residual samples with a scale factor to produce scaled luma residual samples; and
means for determining updated chroma residual samples based on the predictive chroma residual samples and the scaled luma residual samples, wherein the means for determining the updated chroma residual samples comprises means for determining:

$$R_C(x,y)=R_{Cp}(x,y)+(\alpha \cdot R_L(x,y))>>N,$$

wherein $R_L$ is the residual luma samples,
wherein $R_{Cp}$ is the predictive chroma residual samples,
wherein $R_C$ is the updated residual chroma samples,
wherein $\alpha$ is the scale factor, wherein N is a non-negative integer constant parameter, and wherein the block has a YCbCr 4:4:4 format.

34. The device of claim 33, further comprising:
means for quantizing the scaled luma residual samples to produce quantized and scaled luma residual samples, wherein determining the updated chroma residual samples comprises adding the quantized and scaled luma residual samples with the predictive chroma residual samples to produce the updated chroma residual samples.

35. The device of claim 33, wherein the means for determining the updated chroma residual samples further comprises:
means for determining an offset value; and
means for adding the offset to the quantized luma residual samples.

36. The device of claim 35, wherein the means for determining the updated residual samples comprises means for determining:

$$R_C(x,y)=R_{Cp}(x,y)+b+(\alpha \cdot R_L(x,y))>>N,$$

wherein b is the offset value.

37. The device of claim 33, wherein the means for determining the predictive residual chroma samples comprises:
means for determining the updated residual chroma samples responsive to determining that chroma samples of the video block and luma samples of the video block have a same intra prediction direction.

38. A device for encoding video, the device comprising:
means for determining luma residual samples for a block of video data;
means for determining chroma residual samples for the block of video data;
means for scaling the luma residual samples with a scale factor to produce scaled luma residual samples;
means for determining predictive chroma residual samples for the block of video data based on the chroma residual samples and the scaled luma residual samples; and
means for encoding the predictive chroma residual samples and the luma residual samples, wherein the means for determining the predictive chroma residual samples comprises means for determining:

$$R_{Cp}(x,y)=R_C(x,y)-(\alpha \cdot R_L(x,y))>>N,$$

wherein $R_L$ is the residual luma samples,
wherein $R_{Cp}$ is the predictive chroma residual samples,
wherein $R_C$ is the updated residual chroma samples,
wherein $\alpha$ is the scale factor,
wherein N is a non-negative integer constant parameter, and
wherein the block has a YCbCr 4:4:4 format.

39. The device of claim 38, further comprising: means for quantizing the scaled luma residual samples to produce quantized and scaled luma samples, wherein the means for determining the predictive chroma residual samples comprises means for subtracting the quantized and scaled luma residual samples from the chroma residual samples to produce the predictive chroma residual samples.

40. The device of claim 38, further comprising means for encoding information indicating the scale factor in an encoded video bitstream.

41. The device of claim 38, wherein the means for determining the predictive residual chroma samples further comprises:
means for determining an offset value; and
means for subtracting the offset from the residual chroma samples.

42. The device of claim 38, wherein the means for determining the predictive residual chroma samples comprises:
means for determining the predictive residual chroma samples responsive to determining that residual chroma samples of the video block and residual samples of the video block have a same intra prediction direction.

43. A non-transitory computer-readable storage medium having instructions stored thereon that, when executed, cause at least one processor to:
determine luma residual samples for a block of video data;
determine predictive chroma residual samples for the block of video data;
scale the luma residual samples with a scale factor to produce scaled luma residual samples; and
determine updated chroma residual samples based on the predictive chroma residual samples and the scaled luma residual samples, wherein the instructions that, when executed, cause the at least one processor to determine the updated chroma residual samples further cause the at least one processor to determine:

$$R_C(x,y)=R_{Cp}(x,y)+(\alpha \cdot R_L(x,y))>>N,$$

wherein $R_L$ is the residual luma samples,
wherein $R_{Cp}$ is the predictive chroma residual samples,
wherein $R_C$ is the updated residual chroma samples,
wherein $\alpha$ is the scale factor,
wherein N is a non-negative integer constant parameter, and
wherein the block has a YCbCr 4:4:4 format.

44. The non-transitory computer-readable storage medium of claim 43, wherein the instructions, when executed, further cause the at least one processor to:
quantize the scaled luma residual samples to produce quantized and scaled luma residual samples, wherein the instructions that, when executed, cause the at least one processor to determine the updated chroma residual samples further cause the at least one processor to add the quantized and scaled luma residual samples with the predictive chroma residual samples to produce the updated chroma residual samples.

45. The non-transitory computer-readable storage medium of claim 43, wherein the instructions, when executed, further cause the at least one processor to receive the scale factor in an encoded video bitstream.

46. The non-transitory computer-readable storage medium of claim 43, wherein the instructions, when executed, that cause the at least one processor to determine the updated chroma residual samples further cause the at least one processor to:
determine an offset value; and
add the offset to the quantized luma residual samples.

47. The non-transitory computer-readable storage medium of claim 43, wherein the instructions, when executed, that cause the at least one processor to determine the predictive residual chroma samples further cause the at least one processor to:
responsive to determining that chroma samples of the video block and luma samples of the video block have a same intra prediction direction, determine the updated residual chroma samples.

48. A non-transitory computer-readable storage medium having instructions stored thereon that, when executed, cause at least one processor to:
- determine luma residual samples for a block of video data;
- determine chroma residual samples for the block of video data;
- scale the luma residual samples with a scale factor to produce scaled luma residual samples;
- determine predictive chroma residual samples for the block of video data based on the chroma residual samples and the scaled luma residual samples; and
- encode the predictive chroma residual samples and the luma residual samples, wherein the instructions that, when executed, cause the at least one processor to determine the predictive chroma residual samples further cause the at least one processor to determine:

$$R_{Cp}(x,y) = R_C(x,y) - (\alpha \cdot R_L(x,y)) >> N,$$

wherein $R_L$ is the residual luma samples,
wherein $R_{Cp}$ is the predictive chroma residual samples,
wherein $R_C$ is the updated residual chroma samples,
wherein $\alpha$ is the scale factor,
wherein N is a non-negative integer constant parameter, and
wherein the block has a YCbCr 4:4:4 format.

49. The non-transitory computer-readable storage medium of claim 48, wherein the instructions, when executed, further cause the least one processor to: quantize the scaled luma residual samples to produce quantized and scaled luma samples, wherein the instructions that, when executed, cause the at least one processor determine the predictive chroma residual samples further cause the at least one processor to subtract the quantized and scaled luma residual samples from the chroma residual samples to produce the predictive chroma residual samples.

50. The non-transitory computer-readable storage medium of claim 48, wherein the instructions, when executed, further cause the at least one processor to:
- encode information indicating the scale factor in an encoded video bitstream.

51. The non-transitory computer-readable storage medium of claim 48, wherein the instructions that, when executed, cause the at least one processor to determine the predictive chroma residual samples further cause the at least one processor to:
- determine an offset value; and
- subtract the offset from the residual chroma samples.

52. The non-transitory computer-readable storage medium of claim 48, wherein the instructions that, when executed, cause the at least one processor to determine the predictive residual chroma samples further comprise instructions that cause the at least one processor to:
- responsive to determine that residual chroma samples of the video block and residual samples of the video block have a same intra prediction direction, determine the predictive residual chroma samples.

* * * * *